(12) United States Patent
Pieczul et al.

(10) Patent No.: US 11,539,754 B2
(45) Date of Patent: Dec. 27, 2022

(54) TECHNIQUES FOR GENERATING NETWORK SECURITY POLICIES FOR APPLICATION COMPONENTS DEPLOYED IN A COMPUTING ENVIRONMENT

(71) Applicant: Oracle International Corporation, Redwood Shores, CA (US)

(72) Inventors: Olgierd Stanislaw Pieczul, Dublin (IE); Robert Graham Clark, Clyde Hill, WA (US); Nitin Srinivasa Rao Jami, Mercer Island, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 95 days.

(21) Appl. No.: 17/124,162

(22) Filed: Dec. 16, 2020

(65) Prior Publication Data
US 2022/0191248 A1  Jun. 16, 2022

(51) Int. Cl.
*H04L 9/40* (2022.01)
*H04L 43/0882* (2022.01)
(Continued)

(52) U.S. Cl.
CPC ............ *H04L 63/20* (2013.01); *G06F 16/122* (2019.01); *G06F 16/289* (2019.01);
(Continued)

(58) Field of Classification Search
CPC ... G06F 16/289; G06F 16/122; G06F 21/6218
See application file for complete search history.

(56) References Cited

U.S. PATENT DOCUMENTS

| | | | |
|---|---|---|---|
| 8,429,140 B1* | 4/2013 | Lolayekar | G06F 16/289 |
| | | | 707/763 |
| 2012/0109958 A1* | 5/2012 | Thakur | G06F 16/122 |
| | | | 707/E17.089 |

(Continued)

OTHER PUBLICATIONS

Distributed Tracing FAQ, Istio, Available Online at https://istio.io/latest/faq/distributed-tracing/, Accessed from Internet on: Feb. 15, 2021, 3 pages.

(Continued)

*Primary Examiner* — Barbara B Anyan
(74) *Attorney, Agent, or Firm* — Kilpatrick Townsend & Stockton LLP

(57) ABSTRACT

Techniques are disclosed for generating network security policies for different versions of a component of an application deployed in a computing environment where the different versions have potentially different network requirements and the different versions operate together at the same time in the computing environment. The disclosed techniques include capabilities for enabling different versions of a component of a containerized application to co-exist at the same time on different computing nodes in a cluster of nodes in a containerized environment that deploys and executes the application. The techniques additionally include capabilities for enabling different network policies to be generated for the different versions of the component, where each component has potentially different network requirements. The techniques provide a mechanism to create precise, per-component network policies, while respecting the overall coarse-grained policies of the containerized application.

20 Claims, 14 Drawing Sheets

(51) Int. Cl.
H04L 43/0811 (2022.01)
G06F 16/28 (2019.01)
G06F 16/11 (2019.01)

(52) U.S. Cl.
CPC ...... *H04L 43/0811* (2013.01); *H04L 43/0882* (2013.01); *H04L 63/1425* (2013.01)

(56) References Cited

U.S. PATENT DOCUMENTS

| | | | |
|---|---|---|---|
| 2013/0139228 A1 | 5/2013 | Odaira | |
| 2018/0027006 A1* | 1/2018 | Zimmermann | G06F 21/6218 726/11 |
| 2019/0208445 A1 | 7/2019 | Klatsky et al. | |
| 2020/0280576 A1 | 9/2020 | Key et al. | |

OTHER PUBLICATIONS

Extensibility, Istio, Available Online at https://istio.io/latest/docs/concepts/wasm/, Accessed from Internet on: Feb. 15, 2021, 3 pages.
Observability, Istio, Available Online at https://istio.io/latest/docs/concepts/observability/, Accessed from Internet on: Feb. 15, 2021, 5 pages.
Security, Istio, Available Online at https://istio.io/latest/docs/concepts/security/, Accessed from Internet on: Feb. 15, 2021, 19 pages.
Traffic Management, Istio, Available Online at https://istio.io/latest/docs/concepts/traffic-management, Accessed from Internet on: Feb. 15, 2021, 15 pages.
What is Istio?, Istio, Available Online at https://istio.io/latest/docs/concepts/what-is-istio/, Accessed from Internet on: Feb. 15, 2021, 4 pages.
U.S. Appl. No. 17/167,591, Techniques for Network Policies Analysis in Container Frameworks filed Feb. 4, 2021, all pages.
Tufin SecureCloud Solution Brief, Tufin, The Security Policy Company, May 20, 2020, 2 pages.
Moyle, Istion Service Mesh Security Benefits Microservices, Developers, Adaptive Biotechnologies, Available Online at: https://searchcloudsecurity.techtarget.com/tip/Istio-service-mesh-security-benefitsmicroservices-developers, Jun. 17, 2020, 5 pages.
U.S. Appl. No. 17/124,155, filed Dec. 16, 2020.
U.S. Appl. No. 17/167,591, Notice of Allowance dated May 26, 2021, 8 pages.

* cited by examiner

400 ↘

| From (zone) | To (zone) |
|---|---|
| - | web |
| - | front |
| front | services |
| services | services |
| services | data |

402

| From (app) | To (app) |
|---|---|
| - | web-app |
| - | api-gateway |
| api-gateway | user-service |
| api-gateway | order-service |
| api-gateway | invoice-service |
| order-service | user-service |
| invoice-service | user-service |
| user-service | database |
| invoice-service | database |
| order-service | database |
| order-service | message-queue |
| invoice-service | message-queue |

404

| From | To |
|---|---|
| - | zone: web |
| - | zone: front |
| zone: front | zone: services |
| zone: services | zone: services |
| zone: services | app: database |
| app: order-service | app: message-queue |
| app: invoice-service | app: message-queue |

TECHNIQUES FOR GENERATING NETWORK SECURITY POLICIES FOR APPLICATION COMPONENTS DEPLOYED IN A COMPUTING ENVIRONMENT

BACKGROUND

Container orchestration tools provide a robust framework for managing and deploying containerized applications across a cluster of computing nodes in a computing environment. Examples of these tools include, for instance, Kubernetes, Open Shift, Docker Swarm and the like. The usage of these tools has dramatically increased in the recent years with the rising popularity of cloud-based services and changes in the design of services/applications from large and monolithic systems to highly distributed and micro-service based systems. In the micro-service based model, an application is built using a large number of small components communicating over a network. Each component can be independently deployed, upgraded and scaled to a production environment. Software-defined networks are an integral part of the micro-service based model, allowing seamless changes to individual components without disruption. Each time the arrangement of a component within the system changes, the underlying network is reconfigured automatically. Components in such networks typically have dynamically assigned Internet Protocol (IP) addresses that are not stable for a particular component type.

Due to the dynamic nature of the network, existing techniques (e.g., host or network based firewalls) used by container orchestration frameworks for implementing network traffic flow controls are oftentimes inadequate. Since the network traffic leaving the host or traversing the network is often encapsulated, it is very challenging to distinguish traffic at the level of individual components that reside on the hosts (computing nodes). Even if additional logic is introduced to de-encapsulate the packets traversing the network, filtering the network traffic still poses a challenge due to the dynamic nature of the source and destination addresses of the components.

SUMMARY

This disclosure relates generally to virtual networking environments. More specifically, but not by way of limitation, this disclosure describes techniques for generating network security policies for different versions of a component of an application deployed in a computing environment where the different versions have potentially different network requirements and the different versions operate together at the same time in the computing environment.

In certain embodiments, a method for generating component-specific network security policies for components of an application deployed in a computing environment is disclosed. The method includes, for a first version of a component to be deployed as part of a deployed application, monitoring network traffic flow to and from the first version of the component. In some examples, a second version of the component is included in the deployed application and the first version is different from the second version. The method includes identifying a set of one or more network paths for the first version of the component based on the monitoring. In some examples, a network path in the set of one or more network paths identifies at least one other component to which the first version of the component sends traffic.

In some examples, the method includes generating a component identifier that uniquely identifies the first version of the component and generating a first network security policy for the first version of the component. The first network security policy comprises information representative of the set of one or more network paths. The network security policy comprises information indicating that the first network security policy is applicable to first version of the component identified by the component identifier. The method then includes generating a deployment package for the application for adding the first version of the component to the deployed application in addition to the second version of the component. In certain examples, the deployment package comprises the first version of the component and the first network security policy.

In certain examples, the first network security policy identifies the at least one component to which the first version of the component sends and receives network traffic. In some examples, first network security policy includes the component identifier, where the component identifier comprises a version label that uniquely identifies the first version of the component. In some examples, the version label represents a current timestamp, a commit identifier, or a version identifier for the first version of the component.

In certain examples, the method includes deploying the deployment package to a first computing node in a computing environment of the computer system. In certain examples, the second version of the component is deployed on a second computing node in the computing environment. In certain examples, the second version of the component is associated with a second network security policy. The second network security policy comprises information representative of a set of one or more network paths for the second version. In certain examples, a network path in the set of one or more network paths identifies at least one component to which the second version of the component sends and receives traffic.

In certain examples, the second network security policy comprises information indicating that the second network security policy is applicable to second version of the component identified by a component identifier that uniquely identifies the second version of the component. In certain examples, at least one network path in the set of network paths for the first version of the component is different from a network path in a set of network paths for the second version of the component. In certain examples, the second network security policy is different from the first network security policy.

In certain examples, the method includes determining that the set of one or more network paths for the first version of the component are compliant with a set of pre-defined polices defined for the application and responsive to the determining, generating the component identifier that uniquely identifies the first version of the component. The method further includes generating the first network security policy for the first version of the component, where the first network security policy comprises information representative of the set of one or more network paths and the component identifier.

In certain examples, the method includes determining that the set of one or more network paths for the first version of the component are not compliant with a set of pre-defined polices defined for the application and responsive to the determining, providing information indicating a failure of deployment of the new version of the component in the computing environment.

In certain examples, the network security policy for the new version of the component comprises a zone label for the new version of the component, where the zone label identifies a security zone for the new version of the component in the application. In certain examples, the network security policy for the new version of the component comprises an application label for the new version of the component, where the application label identifies a type of the component in the application.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 4 depicts various examples of network polices defined by a container-based framework for a containerized application deployed on a cluster of nodes in the container-based framework, according to certain embodiments.

DETAILED DESCRIPTION

Figure 1:
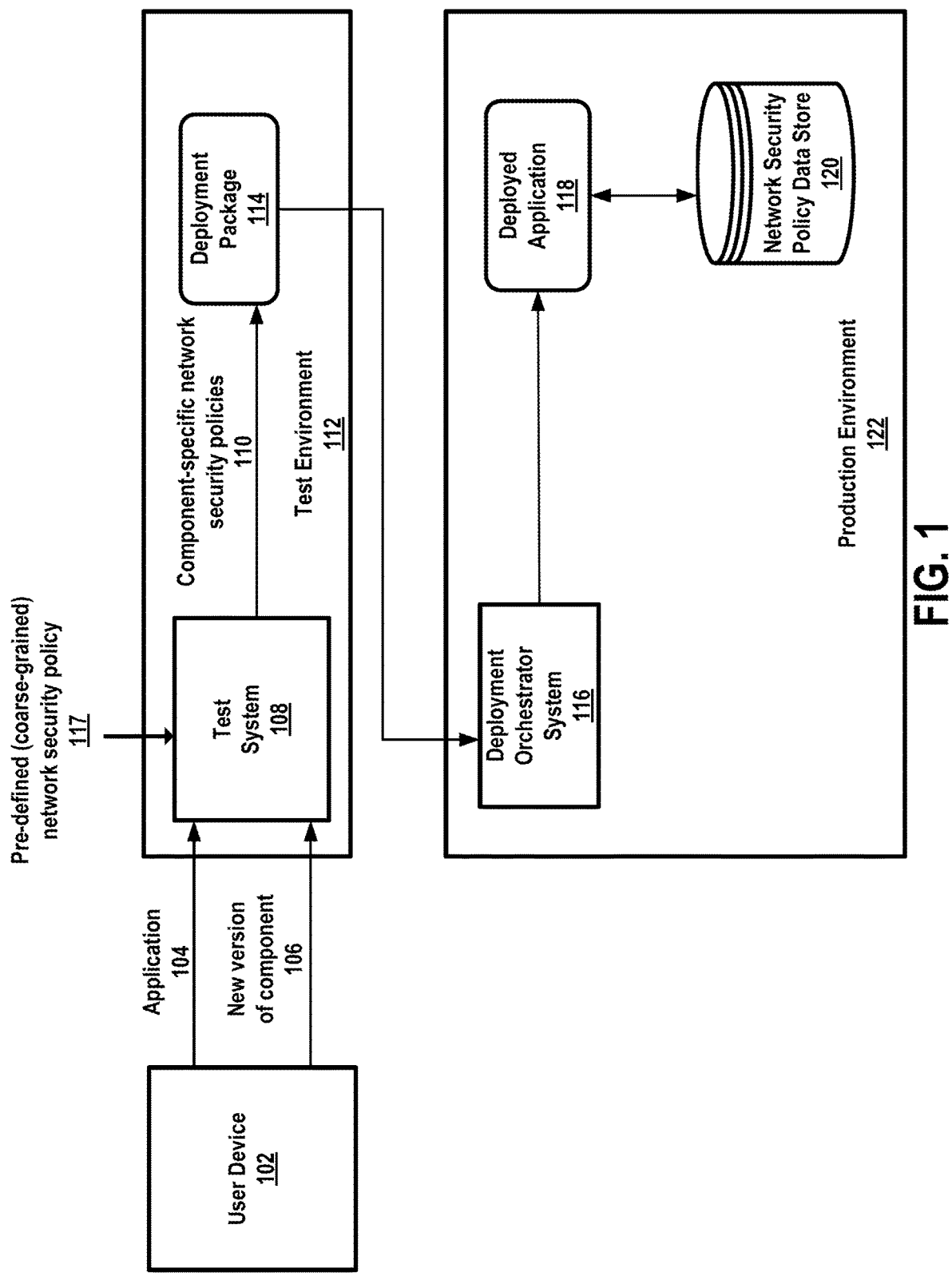
FIG. 1 depicts an example of a distributed computing environment for generating network security policies for components of an application deployed in the computing environment, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

In certain approaches, software defined networks, used in container orchestration tools often by default, allow communication between all the components within the system. For example, in Kubernetes, Common Network Interface plugins are required to assign an Internet Protocol (IP) address to every component (or pod) in an application and the plugins allow traffic between every pod, regardless of the underlying network used. One approach involves the use of software-based tunneling protocols, such as VXLAN, to provide a flat network that moves traffic seamlessly within and between hosts (physical machines or virtual machines) that provide computing instances to the cluster. While, the primary goal of such a network is to provide connectivity for continuously changing workloads, it does not provide security or isolation of network traffic between the components.

To compensate for the challenges faced by container orchestration tools that use traditional network controls to specify policy rules for communication between the components of a containerized application, container orchestration frameworks may provide mechanisms to restrict the traffic within the cluster by specifying a network security policy configuration for the entire application and providing it to the cluster's control plane. The policy indirectly addresses the components through metadata associated with these components. For example, in Kubernetes, the policy specification may not use identifiers of pods, but may instead use pod labels and namespaces where multiple pods can share labels and namespaces. As used herein, a pod may refer to a set of one or more components of an application that may be processed by the orchestration tool at a time.

In certain approaches, in container-based frameworks such as Kubernetes and OpenShift, network policies are distributed as a collection of independent objects. These objects have their own lifecycle, can be changed independently, but affect each other and the system (i.e., the containerized application) as a whole. For example, a policy statement for one object can accidentally overshadow another policy defined for another object. Furthermore, elements that are used to specify the policy, such as component labels, may change independently from the policy itself. It is possible that routine reconfiguration of a component will accidentally impact a policy. Additionally, when tasks of component and network security policy management are split between different teams within an organization, the process of defining network policies for individual components by container-based frameworks becomes even more challenging.

Network security policy management is particularly challenging with a truly continuous delivery model. In this case, individual components are delivered independently, typically with one change to the system at a time. New components may be delivered very frequently, multiple times a day, and each time they may potentially require a different network security configuration. In addition, older and newer versions of the same component are often running in in parallel, to facilitate non-disruptive transition during an upgrade, or to provide a gradual change delivery model. In this model, system processing (defined by a portion of processing, groups of users or other means) is gradually directed to newer components. Gradual rollout of changes allows monitoring changes in a real-life environment and their operation under increased load, without risking a full system disruption. Also, the arrangement of the components may be different in different environments, with different feature sets, regulatory compliance requirements or customer needs.

In such an environment, defining precise security policies is a challenging task. The requirements for policies and connection paths may change on daily basis and manual creation of tight network security policies is not feasible at this rate, speed and degree of automation. In practice, many organizations resort to using a pre-defined set of policies (also referred to herein as coarse-grained network policies) such as the zone-based polices to reflect general network traffic expectations of the system. While a coarse-grained policy developed by users may be used to reflect general network traffic expectations of the system, in container frameworks it is not possible to use a coarse-grained together with a fine-grained policy. This is due to the fact that, if present, the coarse-grained policy would allow all the traffic within its boundaries and overshadow its subset, that is, the fine-grained policy.

The present disclosure describes improved techniques for generating network security policies for different versions of a component of an application deployed in a computing environment where the different versions have potentially different network requirements and where the different versions operate together at the same time in the computing environment. The disclosed systems include capabilities for enabling different versions of a component of a containerized application to co-exist at the same time on different computing nodes in a cluster of nodes in a containerized environment that deploys and executes the application. The disclosed systems additionally include capabilities for enabling different network policies to be generated for the different versions of the component, where each component has potentially different network requirements. The disclosed systems provide a mechanism to create precise, per-component network policies, while respecting a set of pre-defined policies defined for the containerized application.

Referring now to the drawings, FIG. 1 depicts an example of a distributed computing environment 100 for generating network security policies for components of an application deployed in the computing environment, according to certain embodiments. The computing environment 100 may include a test environment 112 and a production environment 122. The test environment 112 and the production environment 122 may comprise one or more computing systems that execute computer-readable instructions (e.g., code, program) to implement the test environment 112 and the production environment 122. As depicted in FIG. 1, the test environment 112 includes a test system 108 and the production environment 122 includes a deployment orchestrator system 116. Portions of data or information used by or generated in the test environment 112 and the production environment 100 as part of its processing may be stored in a persistent memory such as a network security policy data store 120. The systems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The computing environment 100 depicted in FIG. 1 is merely an example and is not intended to unduly limit the scope of claimed embodiments. One of ordinary skill in the art would recognize many possible variations, alternatives, and modifications. For example, in some implementations, the computing environment 100 can be implemented using more or fewer systems than those shown in FIG. 1, may combine two or more systems, or may have a different configuration or arrangement of systems and subsystems.

The computing environment 100 may be implemented in various different configurations. In certain embodiments, the computing environment 100 comprising the test system 108 and the deployment orchestrator system 116 may be implemented in an enterprise servicing users of the enterprise. In other embodiments, the systems in the computing environment 100 may be implemented on one or more servers of a cloud provider and the network security policy creation services of the systems may be provided to subscribers of cloud services on a subscription basis.

In certain embodiments, a user may interact with the test system 108 using a user device 102 that is communicatively coupled to the test system 108, possibly via one or more communication networks. The user device 102 may be of various types, including but not limited to, a mobile phone, a tablet, a desktop computer, and the like. The user may represent a user of an enterprise who subscribes to the services provided by the systems of the computing environment 100 for automatically generating network security policies for components of an application to be deployed in the computing environment. The user may interact with the test system 108 using a browser executed by the user device 102. For example, the user may use a user interface (UI) (which may be a graphical user interface (GUI)) of the browser executed by the user device 102 to interact with the test system 108.

Figure 2:
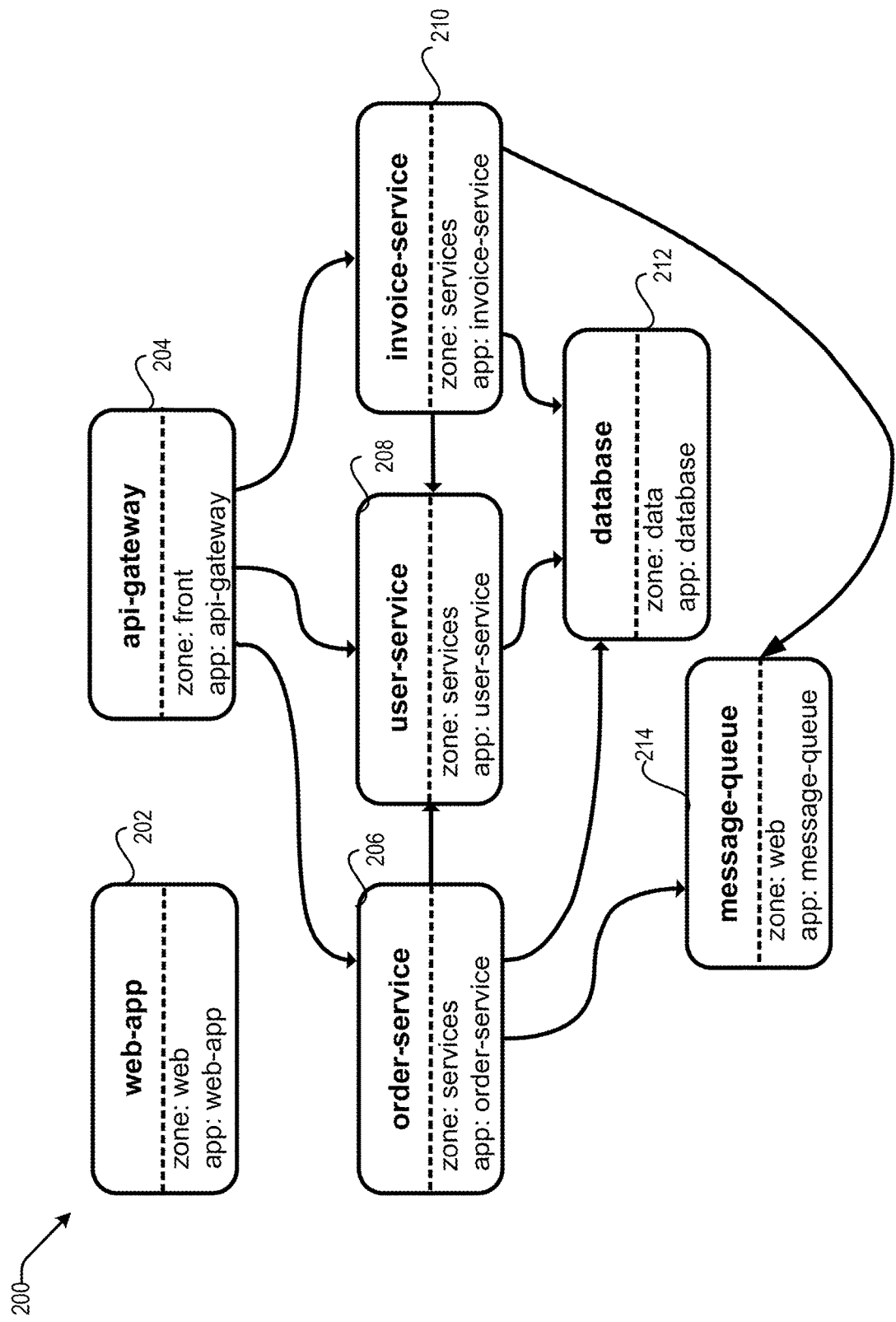
FIG. 2 depicts an example of an application deployed in a containerized environment of the computing environment shown in FIG. 1, according to certain embodiments.

In certain embodiments, a user may, via the UI, provide an application 104 to be deployed in the computing environment. The application 104 may represent a micro-service based containerized application that may be deployed in the production environment 122. In certain examples, the application 104 may comprise multiple components where multiple instances of each component can be executed as containers on nodes within a cluster of nodes in a containerized environment of the production environment 122. In certain examples, the containerized environment may be provided by a container orchestration platform such as Kubernetes, OpenShift, Docker Swarm and the like. An example of an application deployed to a production environment 122 is shown in FIG. 2.

In certain examples, the application 104 (comprising a set of one or more components) may be provided to the test system 108 prior to its deployment in the containerized environment. As part of the testing phase, the test system 108 monitors the network traffic flow between the different components of the application and generates component-specific network security policies 110 for the components based on the discovered network paths/network traffic. In certain embodiments, for each network path identified for a component, the test subsystem 108 performs additional processing to check if the network path violates a pre-defined network security policy 117 (also referred to herein as a coarse-grained network security policy) defined for the test environment/application. The set of pre-defined network security polices 117 may be defined, for example, by the user of the enterprise and these policies reflect general network traffic expectations of the flow of network traffic between the components of the application in the test environment. Examples of coarse-grained polices defined for an application are described in FIG. 4. If it is determined that the coarse-grained network security policy is not violated by any network path identified for the component, the test system 108 generates a component-specific network security policy for the component.

In certain embodiments, as part of the application development process, the test subsystem 108 may be configured to receive (via the UI) a new version of a component 106 of the application 104 to be deployed as part of the application deployed in the containerized environment. For instance, a user of an enterprise may wish to update an earlier version of a component of the application, for example, because the operation performed by the component changed. In this case, the user may provide an updated (or new) version of the component for testing by the test system 108. The test subsystem 108 receives the updated version of the component 106 and generates a component-specific network security policy for the updated version of the component by identifying network paths/network traffic originating from the updated version of the component to one or more other components within the application. Additionally, the test subsystem 108 performs processing to determine if any of the identified network paths violate the coarse-grained network security policy defined in the test environment.

In certain embodiments, as a result of the processing performed by the test system 108, the test system 108, generates a deployment package 114 that includes the component(s) of the application 104 to be deployed and their associated network polices. A deployment orchestrator system 116 in the production environment 122 receives the deployment package 114 and uses the deployment package to deploy the component(s) of the application and their associated network security policies to different nodes in a cluster of nodes in the containerized environment. In certain examples, the deployment orchestrator system 116 stores information identifying the network security policies associated with the different components in the network security policy data store 120.

In certain situations, to facilitate non-disruptive transition during an upgrade, or to provide a gradual change delivery model during the application development process, both an earlier version of the component and an updated (or new) version of the component may need to co-exist and execute in parallel the containerized environment for some time. In certain embodiments, the test system 108 and the deployment orchestrator system 116 include capabilities for enabling different versions of a component of a containerized application to co-exist on different computing nodes in a cluster of nodes of the containerized environment at the same time. The systems additionally include capabilities for enabling different network policies to be generated for and applied to the different versions of the component, where each component has potentially different network require-ments. Additional details related to the processing performed by the various systems of the computing environment 100 in FIG. 1 are described below in FIGS. 2-7.

FIG. 2 depicts an example of an application deployed in a containerized environment of the computing environment 100 shown in FIG. 1, according to certain embodiments. In the depicted example, the application comprises an order processing application 200 that is deployed in a container-based framework within the production environment 122 of the computing environment 100. Multiple instances of each component are executed as containers on nodes within a cluster of nodes within the container-based framework. By way of example, the container-based framework may be implemented using a container orchestration tool such as Kubernetes, OpenShift, Docker Swarm and the like.

In certain examples, the order processing application 200 may include a set of components. These components may include, but are not limited to:
  a static web application front end component 202 providing user experience in the web browser;
  an Application programing Interface (API) gateway component 204 to the application, responsible for processing API calls from the web application component 202 and forwarding them to respective services implementing the business logic;
  a collection of service components providing distinct functions of the application such as processing orders, invoices and user management. By way of example, the collection of service components may include, but are not limited to, an order-service component 206, a user-service component 208 and an invoice-service component 210; and
  data middleware component for storing and processing data, including a database component 212 and a message queue component 214.

In certain examples, for purposes of discussion, it is assumed that the components 202-214 can communicate directly with one another. In a certain implementation, each component is denoted by its name and a corresponding zone label. By way of example, the web application front end component 202 may be denoted by a name "web-app" and a corresponding zone label "web." Additional details of how zone labels are generated for components of a containerized application are described in FIG. 4. Further, in the depicted example, the web application front end component 202 does not communicate with the other components that make up the application 200 but the API gateway component 204 communicates with the services 206, 208 and 210. Additionally, in this example, all the service components, 206, 208 and 210 communicate with each other (but not necessarily each service reaches each other service), the services communicate with the database service 212 and the order-service 206 and invoice-service 210 access the message queue 214.

The different components of the order processing application 200 depicted in FIG. 2 are merely an example and is not intended to unduly limit the scope of claimed embodiments. One of ordinary skill in the art would recognize many possible variations, alternatives, and modifications. For example, in some implementations, the order processing application 200 may comprise more or fewer components than those shown in FIG. 1, may combine two or more components, or may have a different configuration or arrangement of components.

Figure 3:
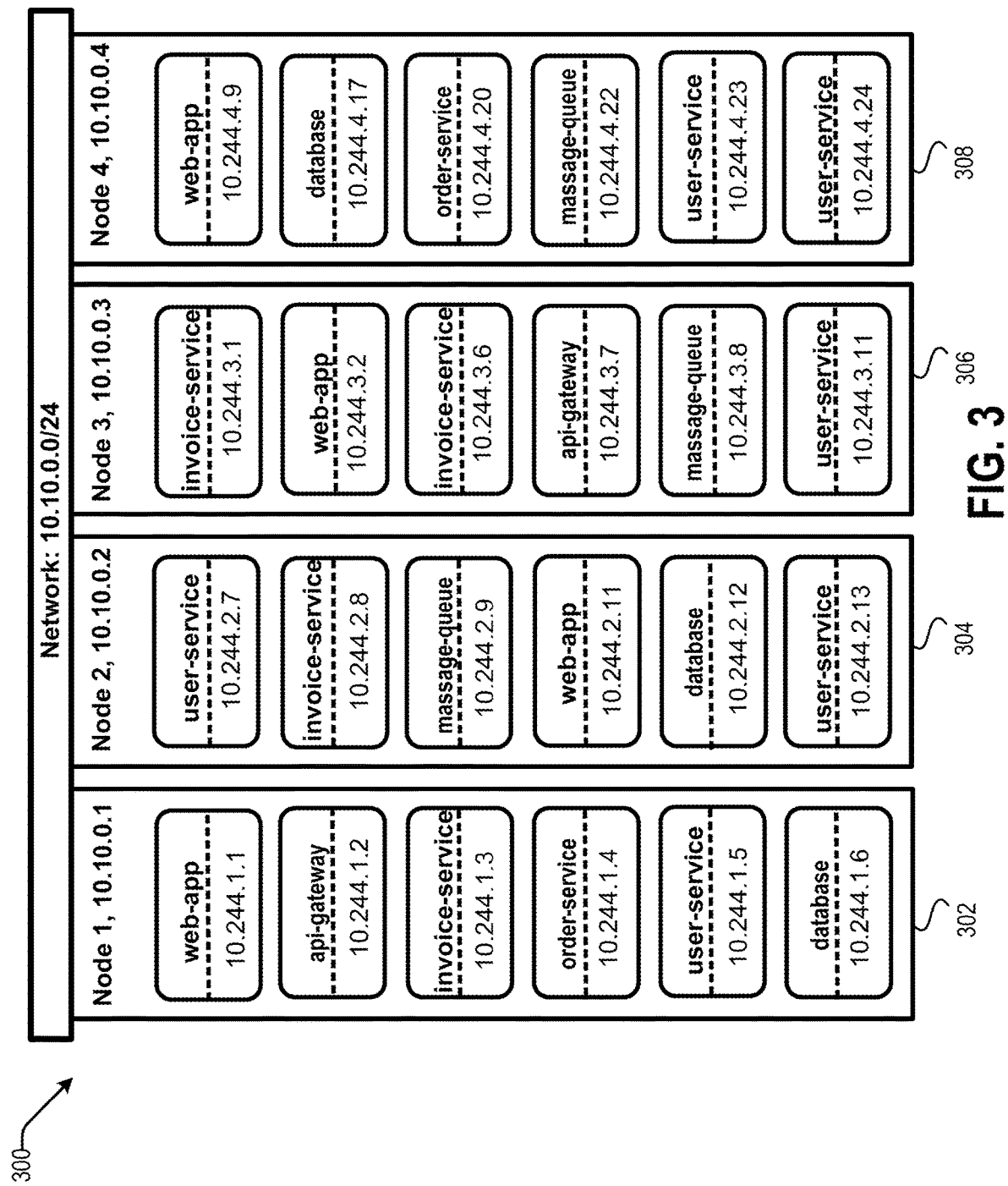
FIG. 3 depicts an example arrangement of components of the application shown in FIG. 2 on a cluster of nodes in a container-based framework, according to certain embodiments.

FIG. 3 depicts an example arrangement of components of the application shown in FIG. 2 on a cluster of nodes 300 in a container-based framework, according to certain embodiments. Each node in the cluster of nodes is assigned an Internet Protocol (IP) address. In the depicted example, the cluster of nodes 300 consists of four nodes (node 1, node 2, node 3 and node 4), each with an IP address within the range of its network, such as cloud Virtual Cloud Network (VCN) or physical network. The containers, residing on each of the nodes in the cluster use a different IP address range. Traffic between components on different nodes is typically tunneled and container-to-container packages are encapsulated as node-to-node packages. The depicted example illustrates a specific arrangement of the components in a point in time snapshot of the container-based framework. The framework may re-arrange the components or move them between nodes to distribute the load. Additionally, the specific containers may fail and new instances may get created, nodes may be added or removed and so forth. In each such case, since the IP addresses of the containers that change will also likely change, any network filtering controls (e.g., network security policies) that are based on identifying components using their IP addresses may be impractical or infeasible to implement by the container-based framework.

As previously described, in order to compensate for these challenges, container orchestration frameworks may include capabilities for controlling the communication (i.e., network traffic) between the components of the application by using a set of one or more pre-defined (coarse-grained) network policies. For example, in a container-based framework such as Kubernetes or OpenShift, the network security policy may be defined based on metadata of the specific components such as "zone labels" as shown in FIG. 4. Additional examples of network policies defined by container-based frameworks for controlling network traffic between multiple components of a containerized application are described in FIG. 4.

FIG. 4 depicts various examples of network polices defined by a container-based framework for a containerized application deployed on a cluster of nodes in the container-based framework, according to certain embodiments. For purposes of discussion, the network policies 402, 404 and 406 are described in relation to the order processing application 200 described in FIGS. 2 and 3. In one implementation, as shown in table 402, the set of policies may be defined using a "zone label" as a source label and a destination label for the components of the containerized application (e.g., 200). In a certain implementation, the set of policies may be implemented using JavaScript Object Notation (JSON) objects or as YAML objects. The zone-based network policies depicted in table 402 may permit some traffic that is not part of the regular system operation, such as connectivity from the user-service component 208 to the database component 212. These zone-based policies will not require to be updated when routine incremental changes occur to the containerized application, such as when more services or database middleware are added to the application. The zone-based policies also continue to be operational if more services begin to communicate with each other, such as, for example, the order-service component 206 and the invoice-service component 210. Also, the zone-based policies defined by the container-based framework typically allow traffic between the components, unless a certain path is specifically covered by the policy. For this reason, in order to deny the internal traffic to certain components (such as 'web' or 'front' zones), the zone-based polices may include policy directives with an empty origin denoted with '-'.

In another approach, as shown in table 404, the set of policies may be implemented using an "app label" as a source label and a destination label where the "app label" uniquely identifies the components of the container-based application. In this implementation, the policy that most precisely reflects the network traffic in the system will take the form shown in table 404. Such a policy may disallow any traffic not expected in the system but changes to the application will require corresponding policy changes to be applied to the components of the application.

In yet another implementation, the container-based framework may implement a more balanced policy that takes advantage of both of the "zone label" and the "app label" used to uniquely identify the components of the application. For example, a security analysis of the application may reveal that a key component of concern is the message queue component 214. While it is acceptable to have general zone-based rules between the api-gateway component 204 and the services 206, 208 and 210, the services themselves, the database component 212 and the communication with the message queue component 214 need to be strictly restricted to the services that need the access. In such a case, the set of policies may take a form shown in table 406. It is to be appreciated that the terms, "zone label" and "app label" used in this disclosure are illustrations of one type of grouping of components that may be utilized in an application for defining the flow of network traffic within the application. For instance, a "zone label" may identify a first group of components to which a first version of the component can send traffic and an "app label" may identify a second group of components to which the first version of the component can send traffic. The "zone label" may identify a larger group (e.g., a set) of components that the first version of the component can send traffic while the "app label" may identify a specific set (e.g., a subset) of components within the larger group that the first version of the component can send traffic. In alternate embodiments, different label names, different label groups or different layers of labels (e.g., a zone cell, a four layer model for referencing the component and the like) may be used to identify and group components of an application.

Figure 5:
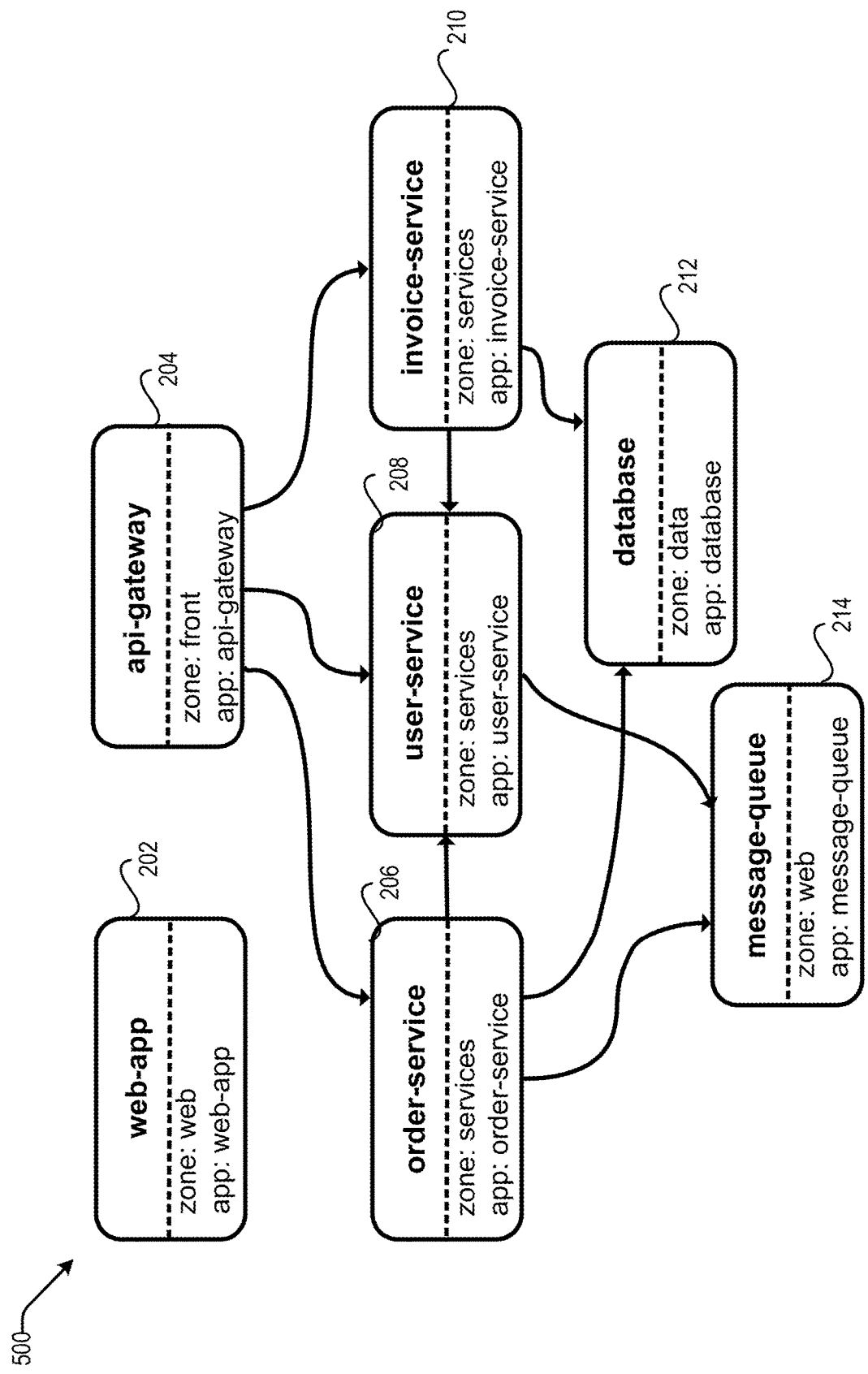
FIG. 5 is an example of the containerized application shown in FIG. 2 depicting a change in the operation of one of the components within the containerized application, according to certain embodiments.

As previously described, in certain situations, a user of an enterprise may wish to add an updated version of an existing component of the application when the operation performed by an earlier/previous version of the component changes. For instance, based on the example of the containerized application 200 shown in FIG. 2, an updated version of the user-service component 208 may be required to communicate with the message queue component 214 instead of the database component 212. FIG. 5 is an example of the containerized application shown in FIG. 2 depicting a change in the operation of one of the components within the containerized application, according to certain embodiments. In the embodiment depicted in FIG. 5, a change in the operation performed by the user-service component 208 results in the user-service component 208 communicating with the message queue component 214 instead of the database component 212. If the change in the operation has to be gradually enabled in the application, both the previous version as well as the updated version of the user-service component 208 have to co-exist and operate in the deployed application for some time. In this situation, the deployed application 200 will contain two versions of the user-service component 208, a previous version that requires network access to the database component 212, but not to the message queue component 214, and another (updated) version that requires access to message queue component 214, but not to the database component 212.

A coarse-grained policy, based on "zone labels" as depicted in table 402 in FIG. 4 may allow the containerized application to operate/execute correctly with either version of the component and with both versions of the components running together. However, such a coarse-grained policy may not be considered sufficiently secure as it allows communication that is not part of regular system operation. At the same time, the user (e.g., a system administrator) would prefer that any policy would be contained in the boundaries defined by the coarse-grained policy.

A fine-grained policy, for example, based on "app labels" as depicted in table 404, will result in a containerized application that initially allows traffic from the user-service component 208 to the database component 212 only. This policy will prevent the updated version of the user-service component 208 to communicate with the message-queue component 214 after the updated version is deployed. However, an updated policy that only allows communication with the message-queue component 214 will disrupt the previous version. Finally, a single policy which allows communication with both versions of components in the data zone may not be sufficiently precise either. Such a policy will allow the previous version of the user-service component to communicate with the message-queue component 214 and the updated version of the user-service component to communicate with the database component. However, both those paths may be overly permissive.

The disclosed system provides improved techniques for generating network security policies for different versions of a component of an application deployed in a computing environment where the different versions have potentially different network requirements and the different versions operate together at the same time in the computing environment. The system provides a mechanism to create precise, per-component network policies, while respecting the overall coarse-grained policies of the containerized application. In certain embodiments, the system includes capabilities for aligning the policy management with the lifecycle of corresponding components of the containerized application. The system builds network policies that are linked to particular deployment packages. The techniques for generating per-component policies by the disclosed system is seamless and does not require additional version labelling by users of the enterprise. Additional details of the operations performed by the systems shown in FIG. 1 for generating network policies for different versions of a component are described in FIG. 6.

Figure 6:
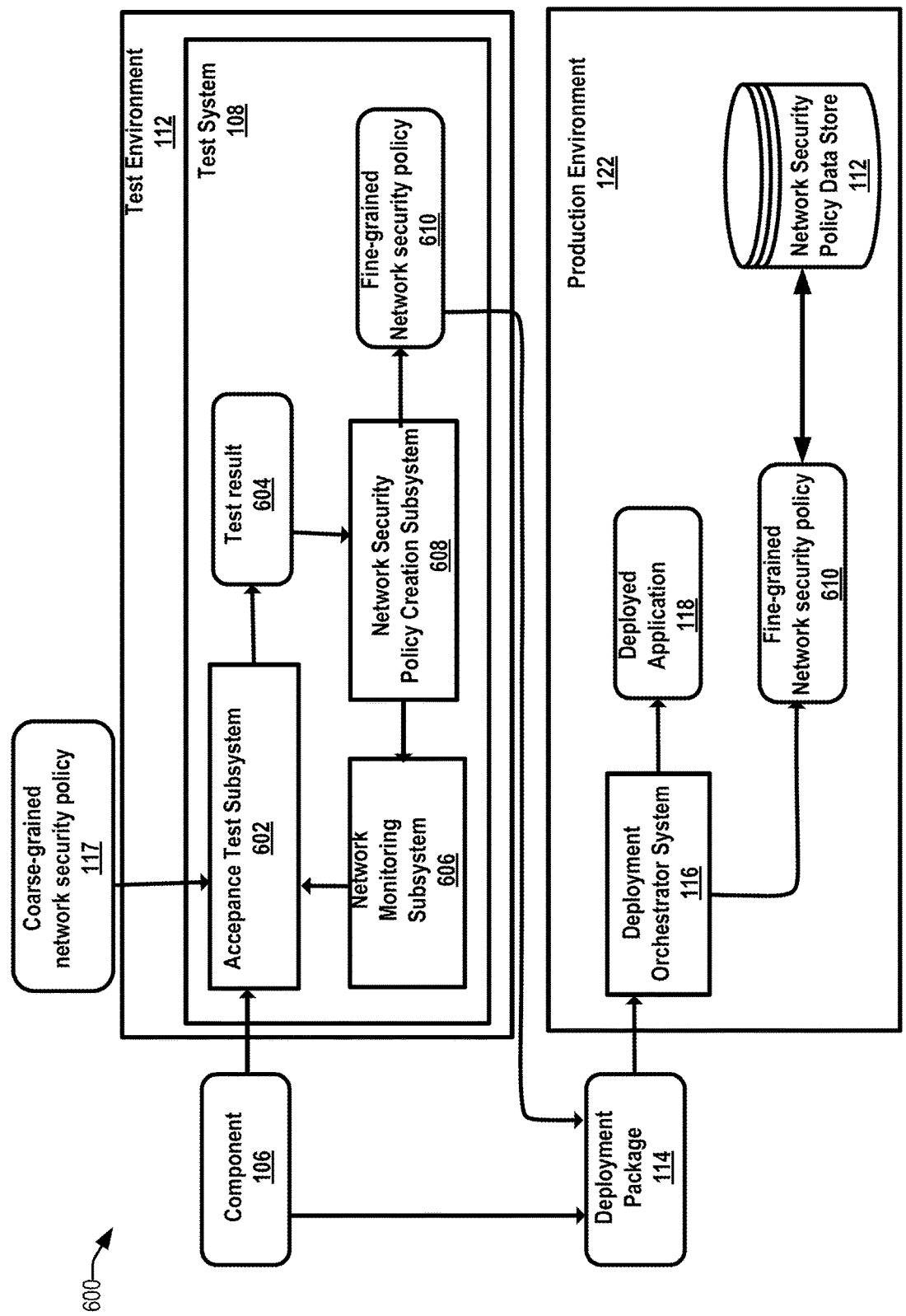
FIG. 6 depicts additional details of the operations performed by the systems shown in FIG. 1 for generating network security policies for components of an application deployed in a computing environment, according to certain embodiments.

FIG. 6 depicts additional details of the operations performed by the systems shown in FIG. 1 for generating network security policies for components of an application deployed in a computing environment, according to certain embodiments. The computing environment 600 may be implemented by one or more computing systems that execute computer-readable instructions (e.g., code, program) to implement the computing environment. As depicted in FIG. 6, the computing environment 600 may include a test environment 108 and a production environment 122. The test environment 108 may include a test system 108. In certain embodiments, the test system 108 includes an acceptance test subsystem 602, a network monitoring subsystem 606 and a network security policy creation subsystem 608. The production environment 122 may include a deployment orchestrator system 116. Portions of data or information used by or generated by systems of the computing environment 600 as part of its processing may be stored in a persistent memory such as a network security policy data store 112.

The systems and subsystems depicted in FIG. 6 may be implemented using software (e.g., code, instructions, program) executed by one or more processing units (e.g., processors, cores) of a computing system, hardware, or combinations thereof. The software may be stored on a non-transitory storage medium (e.g., on a memory device). The computing environment 600 depicted in FIG. 6 is merely an example and is not intended to unduly limit the scope of claimed embodiments. One of ordinary skill in the art would recognize many possible variations, alternatives, and modifications. For example, in some implementations, the computing environment 600 can be implemented using more or fewer subsystems than those shown in FIG. 6, may combine two or more subsystems, or may have a different configuration or arrangement of subsystems.

In certain embodiments, a user (e.g., via the UI of a user device 102) may provide a component 106 of an application (e.g., 104) to the test system 108 to be deployed as part of the application deployed in the computing environment. For instance, as part of the application development process, the user may develop a new component for the application or may create an updated version of an existing component of the application for deployment in the computing environment. As previously described, the application may represent a containerized application deployed in the production environment 122. In certain examples, the application may comprise multiple components where multiple instances of each component may be executed as containers on nodes within a cluster of nodes in the production environment 122.

In certain embodiments, an acceptance test subsystem 602 within the test subsystem 106 receives the component 106 and tests it prior to its deployment in the containerized environment. In certain embodiments, testing the component 106 may involve performing a policy compliance test and a functional acceptance test. Performing a policy compliance test for the component 106, in certain examples, involves, obtaining, by the acceptance test subsystem 602, information identifying the network connections (i.e., the network paths) originating from the component 106. In certain embodiments, the network paths originating from a component may be discovered by the network monitoring subsystem 606 that is communicatively coupled to the acceptance test subsystem 602 via a communication network. Various different techniques may be used to discover a set of network connections for a component. An example of one such technique is described in U.S. patent application Ser. No. 17/124,155, entitled "Automatically inferring software-defined network policies from the observed workload in a computing environment" and filed concurrently with the present application. The entire contents of the aforementioned application is incorporated herein by reference in its entirety for all purposes. The techniques described in U.S. patent application Ser. No. 17/124,155 are merely meant as examples and are not intended to be limiting. Various other techniques may also be used for determining network connections in alternative embodiments.

After obtaining the information identifying the network connections originating from the component 106, as part of performing the policy compliance test for the component 106, the acceptance test subsystem 602 then determines if the network connections that the component are attempting to use are in compliance with the coarse-grained policy 117 defined for the application. As noted above, a coarse-grained policy may be developed by a user (e.g. a developer of the enterprise) of the application. For instance, a coarse-grained policy for an application (e.g., 114) shown in FIG. 2 may be developed using "zone labels" as shown in table 404 of FIG. 4.

In certain embodiments, in addition to the policy compliance test, the acceptance test subsystem 602 may also perform functional testing of the component 106 to confirm that the functionality of the component is behaving as expected. The functional testing may be performed before, after, or in parallel with performing the policy compliance test for the component. As a result of performing the functional acceptance test and the policy compliance test for the component, the acceptance test subsystem 602 outputs a test result 604. The test result 604 outputs information indicative of the success or failure of the functional test and/or the policy compliance test. For instance, if the component 106 did not successfully pass the functional test (in presence of the coarse-grained network security policy 117), the test result 604 may output information indicating that the functional test failed and that the component cannot not be deployed in the containerized environment. The information that is output by the test result in this case may also indicate that a functional bug exists in the execution of the component. If the failure was a result of a coarse-grained policy violation, the test result 604 may output information indicating that the component is attempting to use a network path that is not allowed by the coarse-grained policy. If the component passes the functional test, but a coarse-grained policy violation was detected, the test result 604 may output information indicating that the component will not deployed due to a problem with test coverage.

If the component passes the functional test and no violation of the coarse-grained policy is detected, the test result 604 may indicate that the component can be successfully deployed to production. In this case, the policy creation subsystem 608 creates a fine-grained network security policy (i.e., component-specific network security policy) 610 for the component 106. In certain embodiments, creating the fine-grained network security policy 610 for the component 106 involves, generating, by the policy creation subsystem 608, a component identifier for the component and associating the component with the component identifier. In certain examples, the component identifier is a "version label" that identifies the current version of the component. The version label for a component may represent, for instance, a current timestamp, a commit identifier, or a version identifier for the component. The policy creation subsystem 608 uses the version label and the portion of the network traffic (from the network paths discovered by the network monitoring subsystem 606) originating from the currently processed component (e.g., 106) to generate a fine-grained policy for the component. Examples of fine-grained policies generated by the policy creation subsystem 605 are described in detail below, using the example of the order processing application depicted in FIG. 2. The component, fine-grained policy and other deployment artifacts (such as deployment manifests) are packaged together to create a deployment package 114 for the component.

In certain examples, a deployment orchestrator system 116 in the production environment 122 receives the deployment package 114 and uses the deployment package to deploy the component(s) of the application and their associated network security policies to different nodes in a cluster of nodes within a containerized environment of the production environment 122. The deployed application 118 executes in the containerized environment. In a specific implementation, the containerized environment may be provided by a container orchestration tool such as Kubernetes or OpenShift. In certain examples, the deployment orchestrator system 116 may store the fine grained network security policies 610 associated with the component(s) in the network security policy data store 112.

In certain embodiments, the deployment orchestrator system 116 may be configured to align the lifecycle of a component with its corresponding fine-grained network security policy. For example, for a container-based orchestration platform such as Kubernetes or OpenShift, the alignment of the lifecycle of the component with its corresponding fine-grained network security policy can be implemented using an Operator pattern that replaces the regular interfaces related to deployment of the component and instead accepts a deployment package consisting of the component and its associated fine-grained network security policy. In other examples, an admission controller may be used to capture any operations on the pod. Such a controller may automatically add or remove a corresponding network security policy with a matching label when the component is added/removed from the cluster. A network security policy and its component may also be packaged together in a higher-level object such as a Helm chart that will automatically control the deployment of multiple objects together.

In certain embodiments, the operations performed by the systems shown in the computerized environment 600 described above may be combined with a continuous integration/continuous deployment process. The process may cover the entire lifecycle from building a component to integration/acceptance testing of the component and deployment of the component in the cluster of nodes.

Additional details related to the operations performed by the systems shown in the computerized environment 600 for generating component specific network security policies (i.e., fine-grained network security policies) for components of an application deployed in a containerized environment are now described using the order processing application 200 depicted in FIGS. 2 and 5. In a specific implementation, the containerized environment is provided by a container orchestration platform such as Kubernetes. The cluster of nodes is initially configured with a deny-all policy. Such a policy can be created by matching a component (or a pod) with a label (e.g., a zone label or an app label depicted in FIG. 4) while specifying no network traffic. As previously described, a pod may refer to a set of one or more components of an application that may be processed by the orchestration tool at a time.

A coarse-grained policy for the order processing application 200 may be represented using "zone labels" as shown in table 402. This may be used in the test environment of the test system 108 to perform a policy compliance test for the component as described in FIG. 6. Now consider that the test system 108 receives an update to the user-service component 208 Before receiving the new version of the user-service component 208, the component-specific network security policy (i.e., the fine-grained network security policy) related to user-service component 208 may be depicted as shown below:

{app: user-service, zone: services, version: 1582630603}->{app: database}

The fine-grained policy reflects a current, and at this point in time, the only version of the user-service component 208 that is granted access to the database component 212. A user of the system prepares an updated version of the user-service component 208. This version no longer uses the database component 212 but uses the message-queue component 214 instead. It is intended that the updated version will co-exist with the previous version for some time to allow a smooth transition in the operation of the application. Using the zone labels and the app labels shown in FIG. 4, the user-service component 208 may be identified using the following labels:
{app: user-service, zone: services}

When the updated version of the user-service component 208 is received, the component is packaged in a container and deployed into the test environment. During acceptance testing of the component, a network path from the user-service component 208 to the message-queue component 214 is discovered. The test environment includes a coarse-grained network security policy which may be represented as shown below:
{zone: services}->{zone: data}

This coarse-grained network security policy allows general traffic between services and data zones. The acceptance test passes successfully and there is no policy violation detected. The policy creation subsystem 608 creates a "version label" for the user-service component 208 and associates a "version label" identifier with the component. As an example, the "version label" identifier may be set to '1582650759' (which, in this example, represents a current timestamp). As a result, the updated version of the user-service component 208 may be identified using the labels shown below:
{app: user-service, zone: services, version: 1582650759}

The policy creation subsystem 608 then creates a fine-grained network security policy for the updated version of the user-service component that reflects the discovered network paths from the user-service component. An example of a fine-grained network security policy created for the user-service component is shown below:
{app: user-service, zone: services, version: 1582650759}->{app: message-queue, zone: data}

The fine-grained network security policy is packaged with the updated version of the user-service component into a container and deployed to a node in a cluster of nodes in the containerized environment. When the updated version of the user-service component is deployed, its corresponding fine-grained network security policy is also added to the node.

As a result, the cluster of nodes now has two versions of the user-service component, with the following labels:
  Previous Version: {app: user-service, zone: services, version: 1582630603}
  Updated Version: {app: user-service, zone: services, version: 1582650759}

Also, the cluster of nodes has two separate fine-grained network policies for the user-service component for the previous and updated versions of the component as shown below:
  {app: user-service, zone: services, version: 1582630603}->{app: database, zone: data}
  {app: user-service, zone: services, version: 1582650759}->{app: message-queue, zone: data}

Eventually, the previous version of the user-service component is retired and removed from the cluster of nodes. As a result, the corresponding network security policy is also removed. At that point, the cluster of nodes contains only a single network security policy for the user service component as shown below:
{app: user-service, zone: services, version: 1582650759}->{app: message-queue, zone: data}

Figure 7:
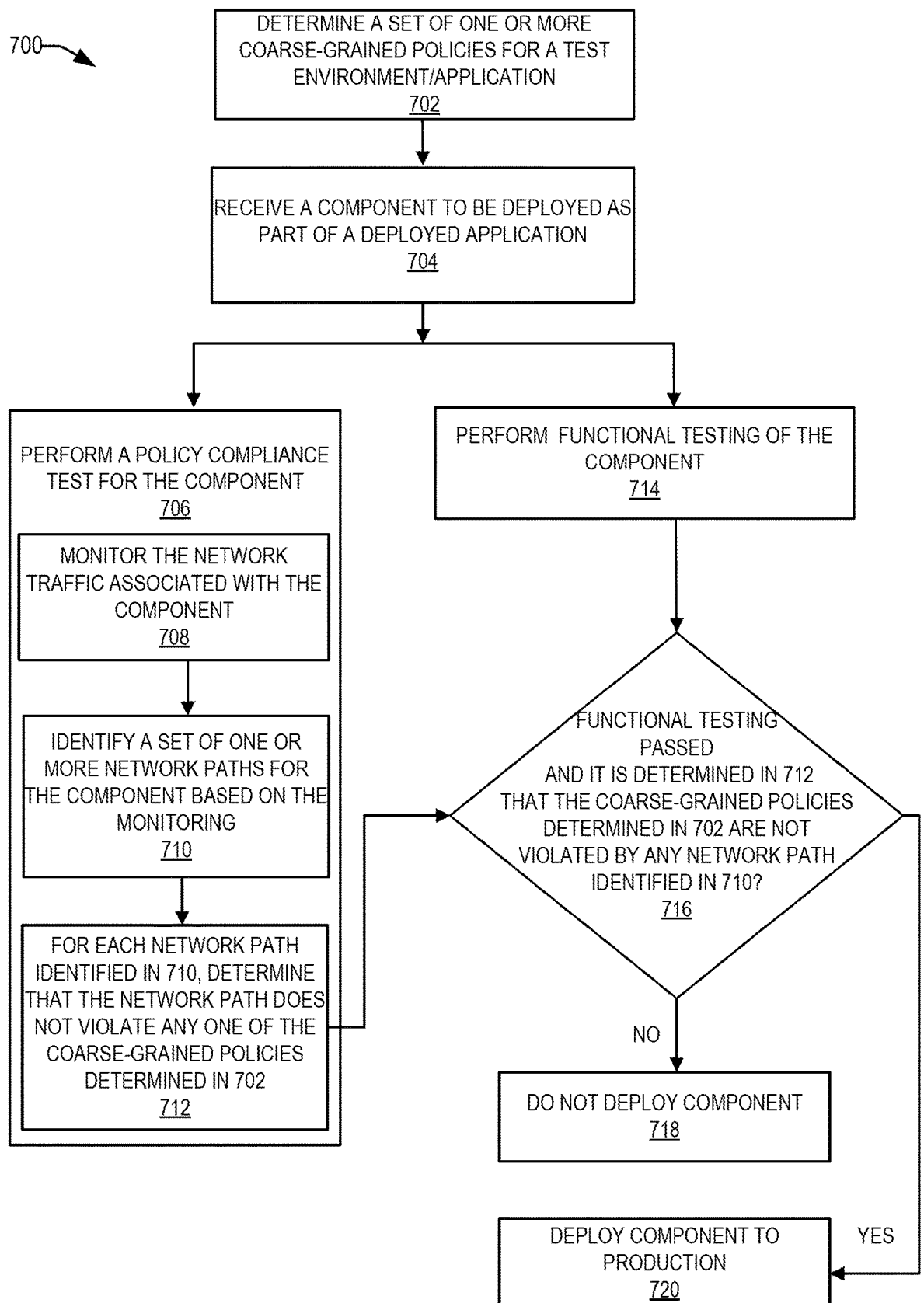
FIG. 7 is an example of a process for generating a network security policy for a component of an application executing in a containerized environment, according to certain embodiments.

FIG. 7 is an example of a process for generating a network security policy for a component of an application executing in a containerized environment, according to certain embodiments. The processing depicted in FIG. 7 may be implemented in software only (e.g., code, instructions, program) executed by one or more processing units (e.g., processors, cores) of the respective systems, hardware only, or combinations thereof. The software may be stored on a non-transitory storage medium (e.g., on a memory device). The process 700 presented in FIG. 7 and described below is intended to be illustrative and non-limiting. Although FIG. 7 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 6, the processing depicted in FIG. 7 may be performed by the acceptance test subsystem 602, the network monitoring subsystem 606 and the network security policy creation subsystem 608.

In the embodiment depicted in FIG. 7, processing is initiated at block 702 when the acceptance test subsystem 602 determines/obtains a set of one or more pre-defined network security policies (i.e., coarse-grained network security polices 117) defined for the test environment/application. As previously described, the set of pre-defined network security policies may be defined, for example, by a user of the enterprise and these policies reflect general network traffic expectations of the flow of network traffic between the components of the application in the test environment. For example, a coarse-grained policy for the order processing application 200 (shown in FIG. 2) may be represented using "zone labels" as shown in table 402 of FIG. 4.

At block 704, the acceptance test subsystem 602 receives a component to be deployed as part of a deployed application in the computing environment. As previously described, the component may be a new component of the application or an updated version of an existing component of the application for deployment in the computing environment.

At block 706, the acceptance test subsystem 602 performs a policy compliance test for the component. As part of performing this test, in certain examples, the acceptance test subsystem 602 provides the component to the network monitoring subsystem 606 which monitors the network traffic flow to and from the component at block 708. At block 710, the network monitoring subsystem 606 identifies a set of one or more network paths for the component based on the monitoring. In certain examples, a network path in the set of network paths identifies a source component from which the component receives packets and/or a target component to which the component sends packets. At block 712, for each network path identified in block 710, the acceptance test subsystem 602 performs a policy compliance test to determine that the network path does not violate any of the coarse-grained policies determined in block 702 for the test environment/application.

In certain embodiments, in addition to the policy compliance test performed at block 706, the acceptance test subsystem 602 may also perform functional testing of the component 106 at block 714 to confirm that the functionality of the component is behaving as expected. The functional testing may be performed before, after, or in parallel with performing the policy compliance test for the component.

At block 716, the acceptance test subsystem 716 performs a check to determine if the functional testing of the component passed and that the coarse-grained network security policies determined in block 702 are not violated by any network path identified in block 710.

If the component passes the functional test and no violation of the coarse-grained policy is detected, the acceptance test subsystem deploys the component to production at block 720. Additional details of the operations performed by the acceptance test subsystem to deploy the component to production are described below with respect to the process depicted in FIG. 8 and its accompanying description. If the component does not pass the functional test and/or a coarse-grained policy violation is detected, the acceptance test subsystem outputs information at block 718 indicating that the component should not be deployed to production.

Figure 8:
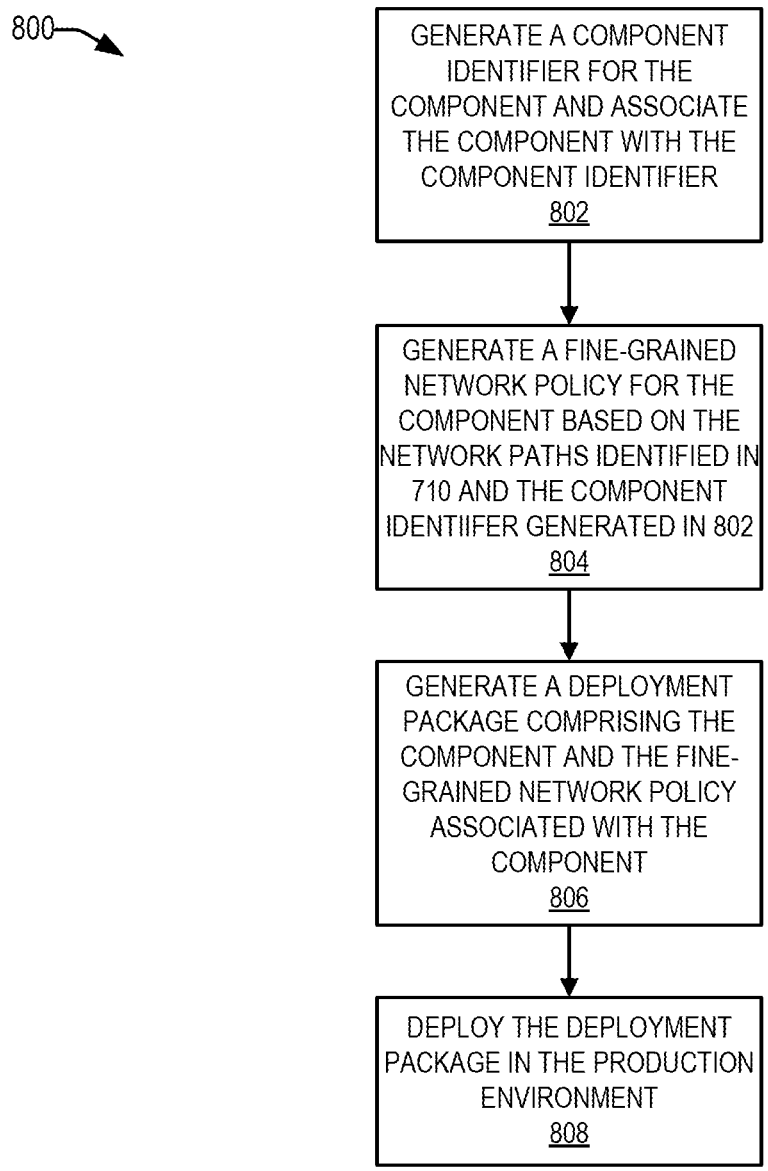
FIG. 8 is an example of a process for generating a network security policy for a component of an application executing in a containerized environment, according to another embodiment

FIG. 8 is an example of a process for generating a network security policy for a component of an application executing in a containerized environment, according to another embodiment. The processing depicted in FIG. 8 describes additional details of the operations performed in block 720 of FIG. 7. The processing depicted in FIG. 8 may be implemented in software only (e.g., code, instructions, program) executed by one or more processing units (e.g., processors, cores) of the respective systems, hardware only, or combinations thereof. The software may be stored on a non-transitory storage medium (e.g., on a memory device). The process 800 presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 6, the processing depicted in FIG. 8 may be performed by the network security policy creation subsystem 608.

In certain embodiments, the processing depicted in the embodiment of FIG. 8 is triggered when the acceptance test subsystem 602 determines that the component can be deployed to production (at block 720 of FIG. 7) because the component has passed the functional test and no violation of the coarse-grained policy has been detected. At block 802, the network security policy creation subsystem 608 generates a component identifier for the component and associates the component with the component identifier. As previously described, the component identifier comprises a version label that uniquely identifies the component. The version label may include, but is not limited to, timestamp, a commit identifier, or a version identifier for the component.

At block 804, the network security policy creation subsystem 608 generates a fine-grained network security policy (i.e., a component-specific network security policy) for the component based on the network paths identified in block 710 (of FIG. 7) and the component identifier generated in block 802. In some examples, the fine-grained network security policy comprises information indicating that the network security policy is applicable to the component identified by the component identifier. In certain examples, as described above, the fine-grained network security policy may include a zone label (e.g., as shown in table 402) where the zone label identifies a security zone for the component in the application/test environment and an application label (shown in the table 404) that identifies a type of the component in the application.

At block 806, the network security policy creation subsystem 608 generates a deployment package comprising the component and the fine-grained network security policy associated with the component.

At block 808, the network security policy creation subsystem 608 deploys the deployment package in the production environment. In certain examples, deploying the deployment package includes deploying the component of and its associated network security policy to a computing node in a cluster of nodes in a containerized environment. As previously described, in certain examples, the containerized environment may be provided by a container orchestration platform such as Kubernetes, OpenShift, Docker Swarm and the like.

In certain embodiments, the disclosed systems include capabilities for enabling different versions of a component of a containerized application to co-exist on different computing nodes in a cluster of nodes of the containerized environment at the same time. The systems additionally include capabilities for enabling different network policies to be applied to the different versions of the component, where each component has potentially different network requirements. By way of example, a first computing node in the cluster of nodes may deploy a first version of a component. The first version of the component may, for instance, be an updated version of a previous version (e.g., a second version) of the component. In certain examples, the second version of the component may be deployed to second computing node in the cluster of nodes. The first version of the component may be associated with a first network security policy where the first network security policy comprises information indicating that the first network security policy is applicable to first version of the component identified by the component identifier. As described above, the first network security policy may additionally identify at least one other component to which the first version of the component sends and receives network traffic. In certain examples, the first network security policy may also identify a zone label and an application label.

Figure 9:
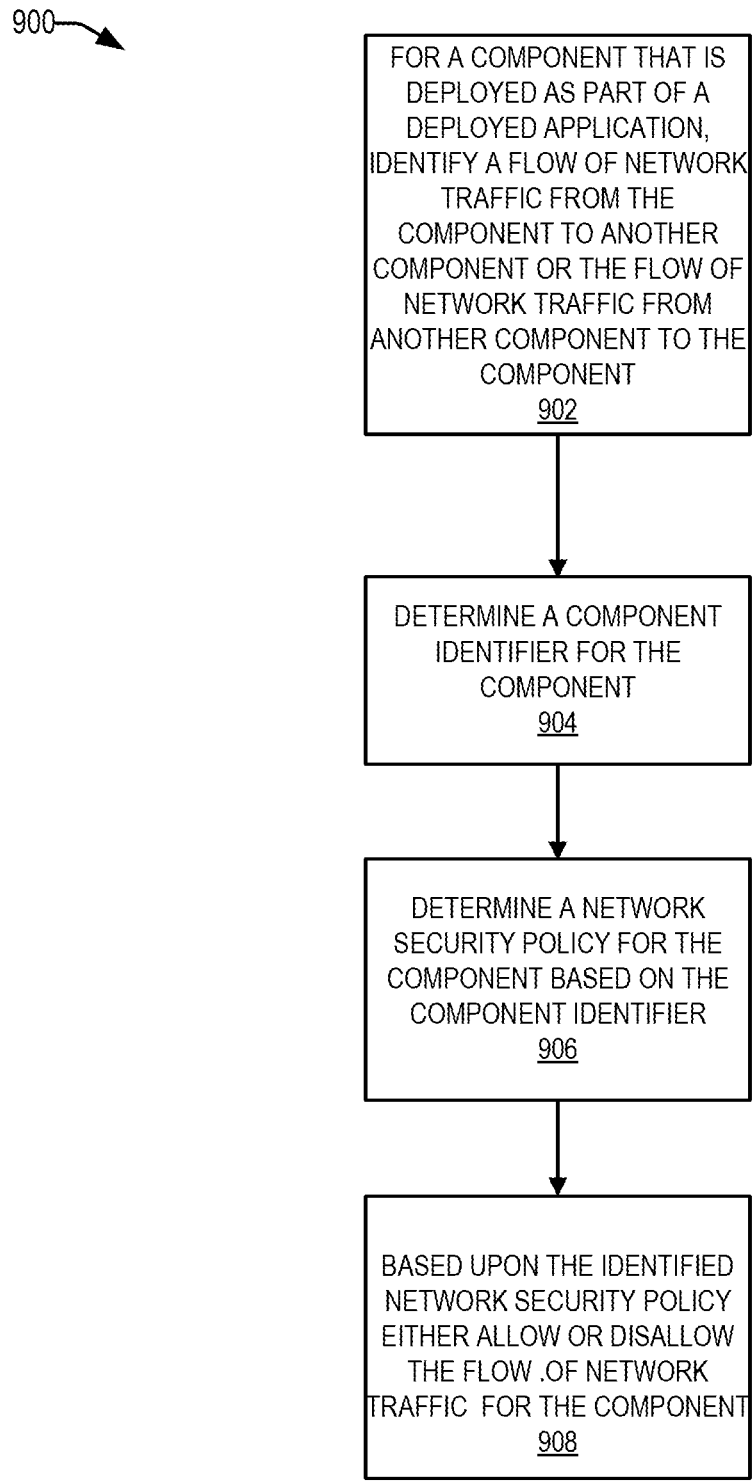
FIG. 9 is an example of a process of the manner in which the network security policy of a component may be utilized, according to certain embodiments

The second version of the component may be associated with a second network security policy where the second network security policy comprises information indicating that the second network security policy is applicable to the second version of the component identified by a component identifier that uniquely identifies the second version of the component. In certain embodiments, at least one network path in the set of network paths for the first version of the component may be different from a network path in a set of network paths for the second version of the component. A first deployment package comprising the first version of the component and the first network security policy is deployed to the first computing node and a second deployment package comprising the second version of the component and the second network security policy is deployed to the second computing node FIG. 9 is an example of a process of the manner in which the network security policy of a component may be utilized, according to certain embodiments. The processing depicted in FIG. 9 may be implemented in software only (e.g., code, instructions, program) executed by one or more processing units (e.g., processors, cores) of the respective systems, hardware only, or combinations thereof. The software may be stored on a non-transitory storage medium (e.g., on a memory device). The process 900 presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 6, the processing depicted in FIG. 9 may be performed by the deployment orchestrator system 116 in the production environment.

At block 902, the process involves identifying a flow of network traffic from a specific component (that is deployed as part of a deployed application) to another component of the application or the flow of network traffic from another component to the specific component. At block 904, the process involves determining a component identifier for the component. At block 906, the process involves determining a network security policy for the component based on the component identifier. At block 908, the process involves either allowing or disallowing the flow of network traffic for the component based on the identified network security policy.

The present disclosure offers several advantages including the ability to generate network security policies for different versions of a component of an application deployed in a computing environment where the different versions have potentially different network requirements and the different versions operate together at the same time in the computing environment. The disclosed systems include capabilities for enabling different versions of a component of a containerized application to co-exist at the same time on different computing nodes in a cluster of nodes in a containerized environment that deploys and executes the application. The disclosed systems additionally include capabilities for enabling different network policies to be generated for the different versions of the component, where each component has potentially different network requirements. The disclosed systems provide a mechanism to create precise, per-component network policies, while respecting the overall coarse-grained policies of the containerized application.

Example Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 10:
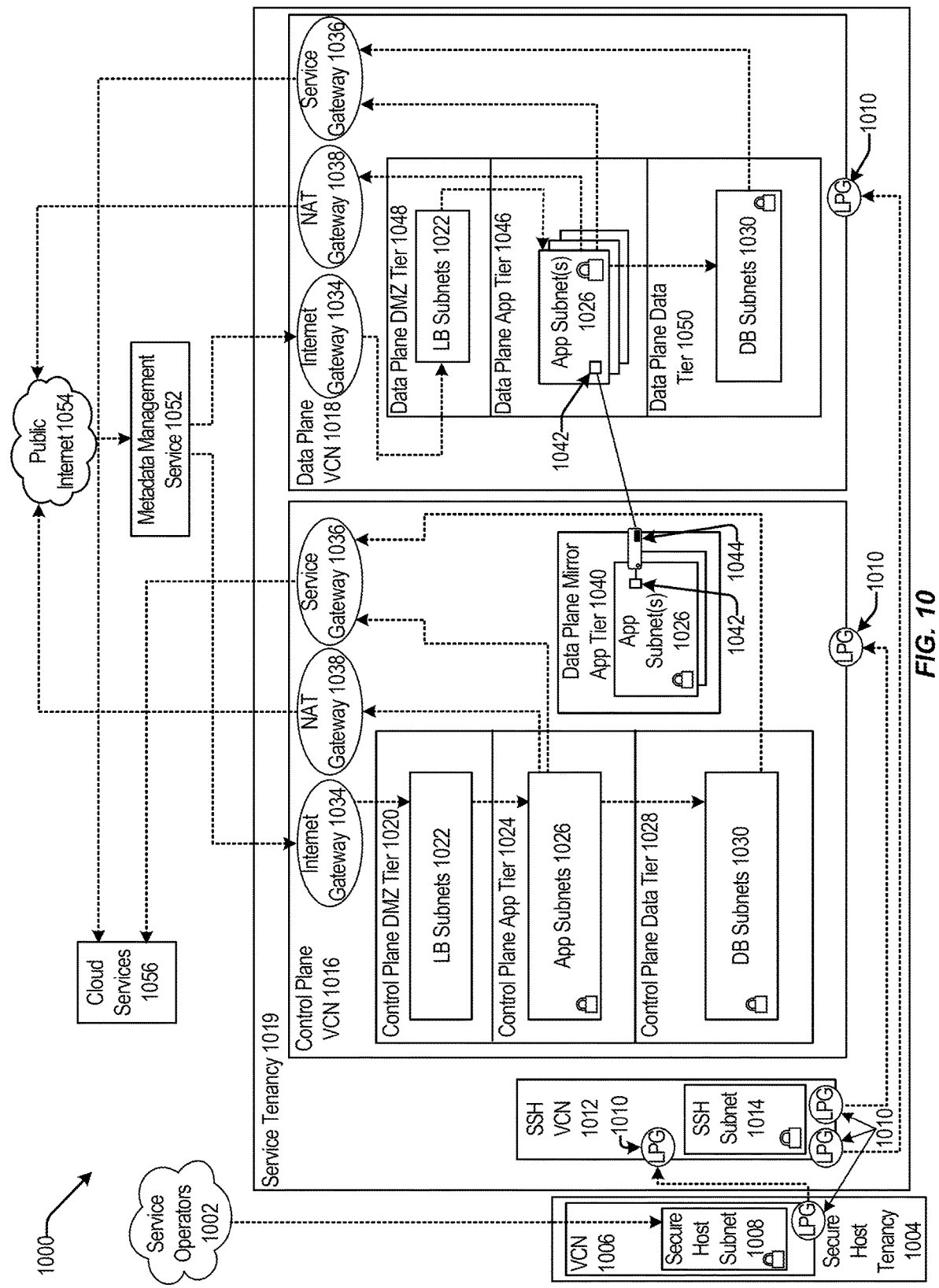
FIG. 10 is a block diagram illustrating one pattern for implementing a cloud infrastructure as a service system, according to at least one embodiment.

FIG. 10 is a block diagram 1000 illustrating an example pattern of an IaaS architecture, according to at least one embodiment. Service operators 1002 can be communicatively coupled to a secure host tenancy 1004 that can include a virtual cloud network (VCN) 1006 and a secure host subnet 1008. In some examples, the service operators 1002 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1006 and/or the Internet.

The VCN 1006 can include a local peering gateway (LPG) 1010 that can be communicatively coupled to a secure shell (SSH) VCN 1012 via an LPG 1010 contained in the SSH VCN 1012. The SSH VCN 1012 can include an SSH subnet 1014, and the SSH VCN 1012 can be communicatively coupled to a control plane VCN 1016 via the LPG 1010 contained in the control plane VCN 1016. Also, the SSH VCN 1012 can be communicatively coupled to a data plane VCN 1018 via an LPG 1010. The control plane VCN 1016 and the data plane VCN 1018 can be contained in a service tenancy 1019 that can be owned and/or operated by the IaaS provider.

The control plane VCN 1016 can include a control plane demilitarized zone (DMZ) tier 1020 that acts as a perimeter network (e.g., portions of a corporate network between the corporate intranet and external networks). The DMZ-based servers may have restricted responsibilities and help keep security breaches contained. Additionally, the DMZ tier 1020 can include one or more load balancer (LB) subnet(s) 1022, a control plane app tier 1024 that can include app subnet(s) 1026, a control plane data tier 1028 that can include database (DB) subnet(s) 1030 (e.g., frontend DB subnet(s) and/or backend DB subnet(s)). The LB subnet(s) 1022 contained in the control plane DMZ tier 1020 can be communicatively coupled to the app subnet(s) 1026 contained in the control plane app tier 1024 and an Internet gateway 1034 that can be contained in the control plane VCN 1016, and the app subnet(s) 1026 can be communicatively coupled to the DB subnet(s) 1030 contained in the control plane data tier 1028 and a service gateway 1036 and a network address translation (NAT) gateway 1038. The control plane VCN 1016 can include the service gateway 1036 and the NAT gateway 1038.

The control plane VCN 1016 can include a data plane mirror app tier 1040 that can include app subnet(s) 1026. The app subnet(s) 1026 contained in the data plane mirror app tier 1040 can include a virtual network interface controller (VNIC) 1042 that can execute a compute instance 1044. The compute instance 1044 can communicatively couple the app subnet(s) 1026 of the data plane mirror app tier 1040 to app subnet(s) 1026 that can be contained in a data plane app tier 1046.

The data plane VCN 1018 can include the data plane app tier 1046, a data plane DMZ tier 1048, and a data plane data tier 1050. The data plane DMZ tier 1048 can include LB subnet(s) 1022 that can be communicatively coupled to the app subnet(s) 1026 of the data plane app tier 1046 and the Internet gateway 1034 of the data plane VCN 1018. The app subnet(s) 1026 can be communicatively coupled to the service gateway 1036 of the data plane VCN 1018 and the NAT gateway 1038 of the data plane VCN 1018. The data plane data tier 1050 can also include the DB subnet(s) 1030 that can be communicatively coupled to the app subnet(s) 1026 of the data plane app tier 1046.

The Internet gateway 1034 of the control plane VCN 1016 and of the data plane VCN 1018 can be communicatively coupled to a metadata management service 1052 that can be communicatively coupled to public Internet 1054. Public Internet 1054 can be communicatively coupled to the NAT gateway 1038 of the control plane VCN 1016 and of the data plane VCN 1018. The service gateway 1036 of the control plane VCN 1016 and of the data plane VCN 1018 can be communicatively couple to cloud services 1056.

In some examples, the service gateway 1036 of the control plane VCN 1016 or of the data plane VCN 1018 can make application programming interface (API) calls to cloud services 1056 without going through public Internet 1054. The API calls to cloud services 1056 from the service gateway 1036 can be one-way: the service gateway 1036 can make API calls to cloud services 1056, and cloud services 1056 can send requested data to the service gateway 1036. But, cloud services 1056 may not initiate API calls to the service gateway 1036.

In some examples, the secure host tenancy 1004 can be directly connected to the service tenancy 1019, which may be otherwise isolated. The secure host subnet 1008 can communicate with the SSH subnet 1014 through an LPG 1010 that may enable two-way communication over an otherwise isolated system. Connecting the secure host subnet 1008 to the SSH subnet 1014 may give the secure host subnet 1008 access to other entities within the service tenancy 1019.

The control plane VCN 1016 may allow users of the service tenancy 1019 to set up or otherwise provision desired resources. Desired resources provisioned in the control plane VCN 1016 may be deployed or otherwise used in the data plane VCN 1018. In some examples, the control plane VCN 1016 can be isolated from the data plane VCN 1018, and the data plane mirror app tier 1040 of the control plane VCN 1016 can communicate with the data plane app tier 1046 of the data plane VCN 1018 via VNICs 1042 that can be contained in the data plane mirror app tier 1040 and the data plane app tier 1046.

In some examples, users of the system, or customers, can make requests, for example create, read, update, or delete (CRUD) operations, through public Internet 1054 that can communicate the requests to the metadata management service 1052. The metadata management service 1052 can communicate the request to the control plane VCN 1016 through the Internet gateway 1034. The request can be received by the LB subnet(s) 1022 contained in the control plane DMZ tier 1020. The LB subnet(s) 1022 may determine that the request is valid, and in response to this determination, the LB subnet(s) 1022 can transmit the request to app subnet(s) 1026 contained in the control plane app tier 1024. If the request is validated and requires a call to public Internet 1054, the call to public Internet 1054 may be transmitted to the NAT gateway 1038 that can make the call to public Internet 1054. Memory that may be desired to be stored by the request can be stored in the DB subnet(s) 1030.

In some examples, the data plane mirror app tier 1040 can facilitate direct communication between the control plane VCN 1016 and the data plane VCN 1018. For example, changes, updates, or other suitable modifications to configuration may be desired to be applied to the resources contained in the data plane VCN 1018. Via a VNIC 1042, the control plane VCN 1016 can directly communicate with, and can thereby execute the changes, updates, or other suitable modifications to configuration to, resources contained in the data plane VCN 1018.

In some embodiments, the control plane VCN 1016 and the data plane VCN 1018 can be contained in the service tenancy 1019. In this case, the user, or the customer, of the system may not own or operate either the control plane VCN 1016 or the data plane VCN 1018. Instead, the IaaS provider may own or operate the control plane VCN 1016 and the data plane VCN 1018, both of which may be contained in the service tenancy 1019. This embodiment can enable isolation of networks that may prevent users or customers from interacting with other users', or other customers', resources. Also, this embodiment may allow users or customers of the system to store databases privately without needing to rely on public Internet 1054, which may not have a desired level of security, for storage.

In other embodiments, the LB subnet(s) 1022 contained in the control plane VCN 1016 can be configured to receive a signal from the service gateway 1036. In this embodiment, the control plane VCN 1016 and the data plane VCN 1018 may be configured to be called by a customer of the IaaS provider without calling public Internet 1054. Customers of the IaaS provider may desire this embodiment since database(s) that the customers use may be controlled by the IaaS provider and may be stored on the service tenancy 1019, which may be isolated from public Internet 1054.

Figure 11:
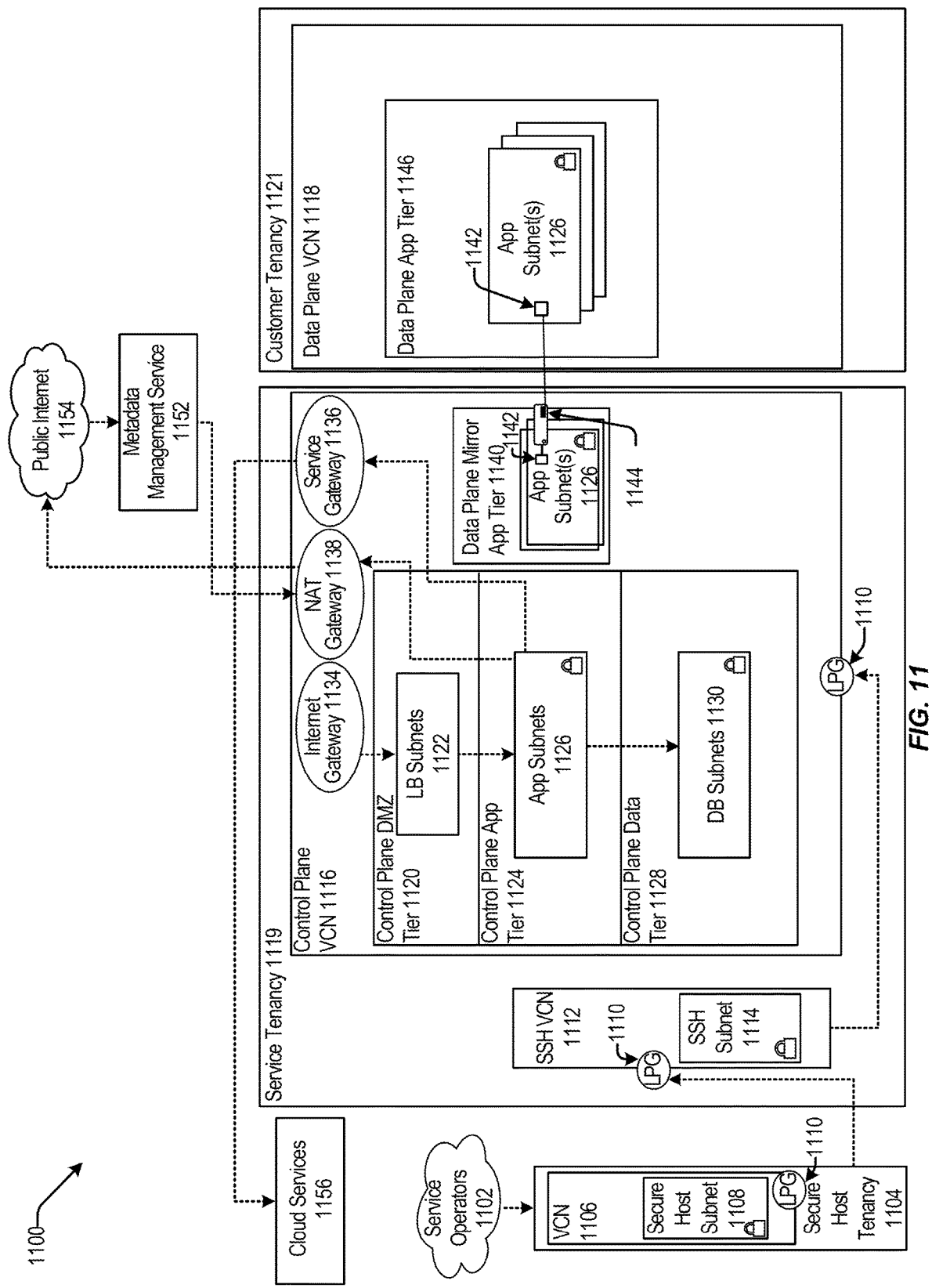
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 1002 of FIG. 10) can be communicatively coupled to a secure host tenancy 1104 (e.g. the secure host tenancy 1004 of FIG. 10) that can include a virtual cloud network (VCN) 1106 (e.g. the VCN 1006 of FIG. 10) and a secure host subnet 1108 (e.g. the secure host subnet 1008 of FIG. 10). The VCN 1106 can include a local peering gateway (LPG) 1110 (e.g. the LPG 1010 of FIG. 10) that can be communicatively coupled to a secure shell (SSH) VCN 1112 (e.g. the SSH VCN 1012 of FIG. 10) via an LPG 1010 contained in the SSH VCN 1112. The SSH VCN 1112 can include an SSH subnet 1114 (e.g. the SSH subnet 1014 of FIG. 10), and the SSH VCN 1112 can be communicatively coupled to a control plane VCN 1116 (e.g. the control plane VCN 1016 of FIG. 10) via an LPG 1110 contained in the control plane VCN 1116. The control plane VCN 1116 can be contained in a service tenancy 1119 (e.g. the service tenancy 1019 of FIG. 10), and the data plane VCN 1118 (e.g. the data plane VCN 1018 of FIG. 10) can be contained in a customer tenancy 1121 that may be owned or operated by users, or customers, of the system.

The control plane VCN 1116 can include a control plane DMZ tier 1120 (e.g. the control plane DMZ tier 1020 of FIG. 10) that can include LB subnet(s) 1122 (e.g. LB subnet(s) 1022 of FIG. 10), a control plane app tier 1124 (e.g. the control plane app tier 1024 of FIG. 10) that can include app subnet(s) 1126 (e.g. app subnet(s) 1026 of FIG. 10), a control plane data tier 1128 (e.g. the control plane data tier 1028 of FIG. 10) that can include database (DB) subnet(s) 1130 (e.g. similar to DB subnet(s) 1030 of FIG. 10). The LB subnet(s) 1122 contained in the control plane DMZ tier 1120 can be communicatively coupled to the app subnet(s) 1126 contained in the control plane app tier 1124 and an Internet gateway 1134 (e.g. the Internet gateway 1034 of FIG. 10) that can be contained in the control plane VCN 1116, and the app subnet(s) 1126 can be communicatively coupled to the DB subnet(s) 1130 contained in the control plane data tier 1128 and a service gateway 1136 (e.g. the service gateway of FIG. 10) and a network address translation (NAT) gateway 1138 (e.g. the NAT gateway 1038 of FIG. 10). The control plane VCN 1116 can include the service gateway 1136 and the NAT gateway 1138.

The control plane VCN 1116 can include a data plane mirror app tier 1140 (e.g. the data plane mirror app tier 1040 of FIG. 10) that can include app subnet(s) 1126. The app subnet(s) 1126 contained in the data plane mirror app tier 1140 can include a virtual network interface controller (VNIC) 1142 (e.g. the VNIC of 1042) that can execute a compute instance 1144 (e.g. similar to the compute instance 1044 of FIG. 10). The compute instance 1144 can facilitate communication between the app subnet(s) 1126 of the data plane mirror app tier 1140 and the app subnet(s) 1126 that can be contained in a data plane app tier 1146 (e.g. the data plane app tier 1046 of FIG. 10) via the VNIC 1142 contained in the data plane mirror app tier 1140 and the VNIC 1142 contained in the data plane app tier 1146.

The Internet gateway 1134 contained in the control plane VCN 1116 can be communicatively coupled to a metadata management service 1152 (e.g. the metadata management service 1052 of FIG. 10) that can be communicatively coupled to public Internet 1154 (e.g. public Internet 1054 of FIG. 10). Public Internet 1154 can be communicatively coupled to the NAT gateway 1138 contained in the control plane VCN 1116. The service gateway 1136 contained in the control plane VCN 1116 can be communicatively couple to cloud services 1156 (e.g. cloud services 1056 of FIG. 10).

In some examples, the data plane VCN 1118 can be contained in the customer tenancy 1121. In this case, the IaaS provider may provide the control plane VCN 1116 for each customer, and the IaaS provider may, for each customer, set up a unique compute instance 1144 that is contained in the service tenancy 1119. Each compute instance 1144 may allow communication between the control plane VCN 1116, contained in the service tenancy 1119, and the data plane VCN 1118 that is contained in the customer tenancy 1121. The compute instance 1144 may allow resources, that are provisioned in the control plane VCN 1116 that is contained in the service tenancy 1119, to be deployed or otherwise used in the data plane VCN 1118 that is contained in the customer tenancy 1121.

In other examples, the customer of the IaaS provider may have databases that live in the customer tenancy 1121. In this example, the control plane VCN 1116 can include the data plane mirror app tier 1140 that can include app subnet(s) 1126. The data plane mirror app tier 1140 can reside in the data plane VCN 1118, but the data plane mirror app tier 1140 may not live in the data plane VCN 1118. That is, the data plane mirror app tier 1140 may have access to the customer tenancy 1121, but the data plane mirror app tier 1140 may not exist in the data plane VCN 1118 or be owned or operated by the customer of the IaaS provider. The data plane mirror app tier 1140 may be configured to make calls to the data plane VCN 1118 but may not be configured to make calls to any entity contained in the control plane VCN 1116. The customer may desire to deploy or otherwise use resources in the data plane VCN 1118 that are provisioned in the control plane VCN 1116, and the data plane mirror app tier 1140 can facilitate the desired deployment, or other usage of resources, of the customer.

In some embodiments, the customer of the IaaS provider can apply filters to the data plane VCN 1118. In this embodiment, the customer can determine what the data plane VCN 1118 can access, and the customer may restrict access to public Internet 1154 from the data plane VCN 1118. The IaaS provider may not be able to apply filters or otherwise control access of the data plane VCN 1118 to any outside networks or databases. Applying filters and controls by the customer onto the data plane VCN 1118, contained in the customer tenancy 1121, can help isolate the data plane VCN 1118 from other customers and from public Internet 1154.

In some embodiments, cloud services 1156 can be called by the service gateway 1136 to access services that may not exist on public Internet 1154, on the control plane VCN 1116, or on the data plane VCN 1118. The connection between cloud services 1156 and the control plane VCN 1116 or the data plane VCN 1118 may not be live or continuous. Cloud services 1156 may exist on a different network owned or operated by the IaaS provider. Cloud services 1156 may be configured to receive calls from the service gateway 1136 and may be configured to not receive calls from public Internet 1154. Some cloud services 1156 may be isolated from other cloud services 1156, and the control plane VCN 1116 may be isolated from cloud services 1156 that may not be in the same region as the control plane VCN 1116. For example, the control plane VCN 1116 may be located in "Region 1," and cloud service "Deployment 10," may be located in Region 1 and in "Region 2." If a call to Deployment 10 is made by the service gateway 1136 contained in the control plane VCN 1116 located in Region 1, the call may be transmitted to Deployment 10 in Region 1. In this example, the control plane VCN 1116, or Deployment 10 in Region 1, may not be communicatively coupled to, or otherwise in communication with, Deployment 10 in Region 2.

Figure 12:
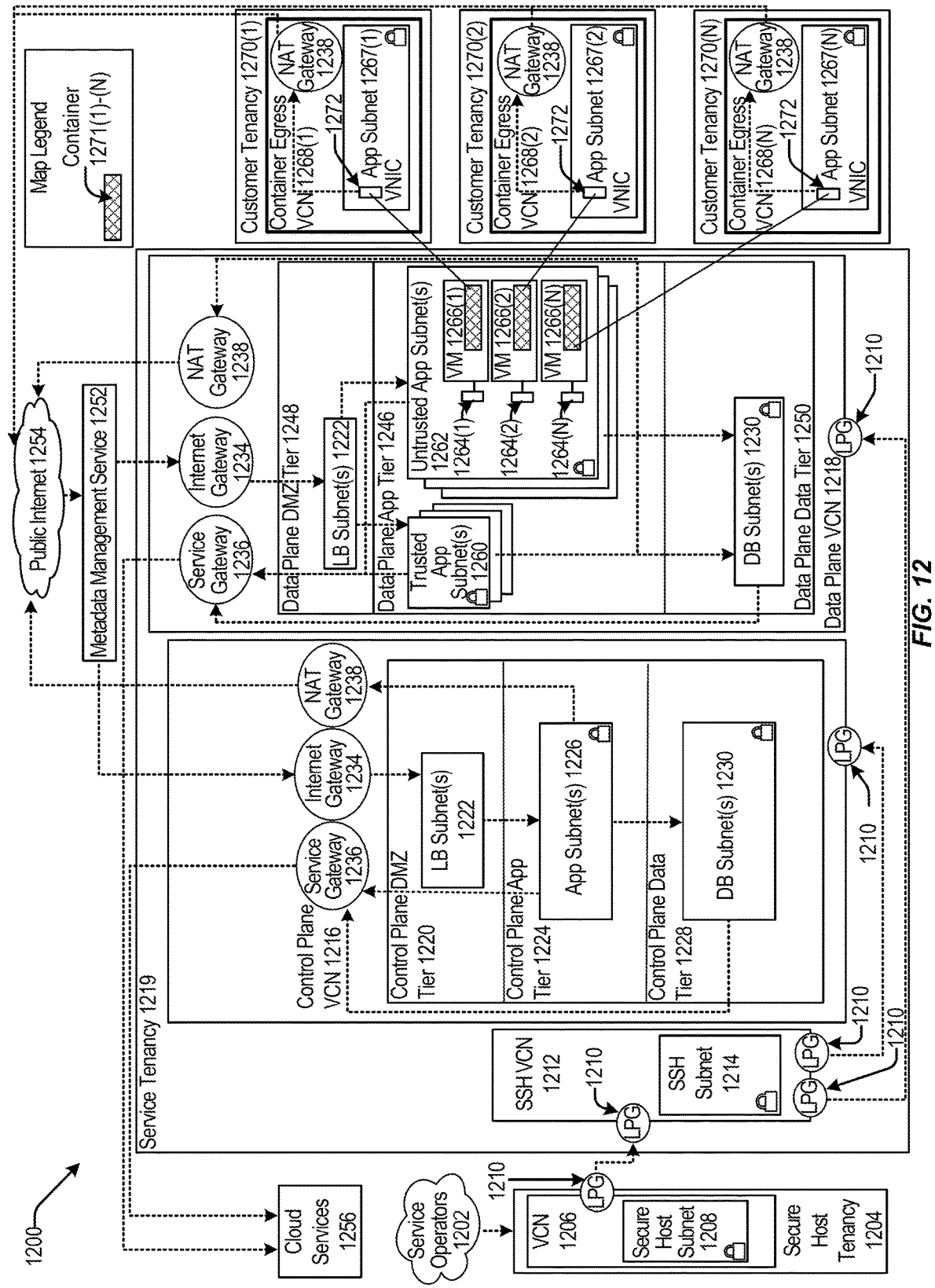
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 1002 of FIG. 10) can be communicatively coupled to a secure host tenancy 1204 (e.g. the secure host tenancy 1004 of FIG. 10) that can include a virtual cloud network (VCN) 1206 (e.g. the VCN 1006 of FIG. 10) and a secure host subnet 1208 (e.g. the secure host subnet 1008 of FIG. 10). The VCN 1206 can include an LPG 1210 (e.g. the LPG 1010 of FIG. 10) that can be communicatively coupled to an SSH VCN 1212 (e.g. the SSH VCN 1012 of FIG. 10) via an LPG 1210 contained in the SSH VCN 1212. The SSH VCN 1212 can include an SSH subnet 1214 (e.g. the SSH subnet 1014 of FIG. 10), and the SSH VCN 1212 can be communicatively coupled to a control plane VCN 1216 (e.g. the control plane VCN 1016 of FIG. 10) via an LPG 1210 contained in the control plane VCN 1216 and to a data plane VCN 1218 (e.g. the data plane 1018 of FIG. 10) via an LPG 1210 contained in the data plane VCN 1218. The control plane VCN 1216 and the data plane VCN 1218 can be contained in a service tenancy 1219 (e.g. the service tenancy 1019 of FIG. 10).

The control plane VCN 1216 can include a control plane DMZ tier 1220 (e.g. the control plane DMZ tier 1020 of FIG. 10) that can include load balancer (LB) subnet(s) 1222 (e.g. LB subnet(s) 1022 of FIG. 10), a control plane app tier 1224 (e.g. the control plane app tier 1024 of FIG. 10) that can include app subnet(s) 1226 (e.g. similar to app subnet(s) 1026 of FIG. 10), a control plane data tier 1228 (e.g. the control plane data tier 1028 of FIG. 10) that can include DB subnet(s) 1230. The LB subnet(s) 1222 contained in the control plane DMZ tier 1220 can be communicatively coupled to the app subnet(s) 1226 contained in the control plane app tier 1224 and to an Internet gateway 1234 (e.g. the Internet gateway 1034 of FIG. 10) that can be contained in the control plane VCN 1216, and the app subnet(s) 1226 can be communicatively coupled to the DB subnet(s) 1230 contained in the control plane data tier 1228 and to a service gateway 1236 (e.g. the service gateway of FIG. 10) and a network address translation (NAT) gateway 1238 (e.g. the NAT gateway 1038 of FIG. 10). The control plane VCN 1216 can include the service gateway 1236 and the NAT gateway 1238.

The data plane VCN 1218 can include a data plane app tier 1246 (e.g. the data plane app tier 1046 of FIG. 10), a data plane DMZ tier 1248 (e.g. the data plane DMZ tier 1048 of FIG. 10), and a data plane data tier 1250 (e.g. the data plane data tier 1050 of FIG. 10). The data plane DMZ tier 1248 can include LB subnet(s) 1222 that can be communicatively coupled to trusted app subnet(s) 1260 and untrusted app subnet(s) 1262 of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include one or more primary VNICs 1264(1)-(N) that can be communicatively coupled to tenant virtual machines (VMs) 1266(1)-(N). Each tenant VM 1266(1)-(N) can be communicatively coupled to a respective app subnet 1267(1)-(N) that can be contained in respective container egress VCNs 1268(1)-(N) that can be contained in respective customer tenancies 1270(1)-(N). Respective secondary VNICs 1272(1)-(N) can facilitate communication between the untrusted app subnet(s) 1262 contained in the data plane VCN 1218 and the app subnet contained in the container egress VCNs 1268(1)-(N). Each container egress VCNs 1268(1)-(N) can include a NAT gateway 1238 that can be communicatively coupled to public Internet 1254 (e.g. public Internet 1054 of FIG. 10).

The Internet gateway 1234 contained in the control plane VCN 1216 and contained in the data plane VCN 1218 can be communicatively coupled to a metadata management service 1252 (e.g. the metadata management system 1052 of FIG. 10) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some embodiments, the data plane VCN 1218 can be integrated with customer tenancies 1270. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1246. Code to run the function may be executed in the VMs 1266(1)-(N), and the code may not be configured to run anywhere else on the data plane VCN 1218. Each VM 1266(1)-(N) may be connected to one customer tenancy 1270. Respective containers 1271(1)-(N) contained in the VMs 1266(1)-(N) may be configured to run the code. In this case, there can be a dual isolation (e.g., the containers 1271(1)-(N) running code, where the containers 1271(1)-(N) may be contained in at least the VM 1266(1)-(N) that are contained in the untrusted app subnet(s) 1262), which may help prevent incorrect or otherwise undesirable code from damaging the network of the IaaS provider or from damaging a network of a different customer. The containers 1271(1)-(N) may be communicatively coupled to the customer tenancy 1270 and may be configured to transmit or receive data from the customer tenancy 1270. The containers 1271(1)-(N) may not be configured to transmit or receive data from any other entity in the data plane VCN 1218. Upon completion of running the code, the IaaS provider may kill or otherwise dispose of the containers 1271(1)-(N).

In some embodiments, the trusted app subnet(s) 1260 may run code that may be owned or operated by the IaaS provider. In this embodiment, the trusted app subnet(s) 1260 may be communicatively coupled to the DB subnet(s) 1230 and be configured to execute CRUD operations in the DB subnet(s) 1230. The untrusted app subnet(s) 1262 may be communicatively coupled to the DB subnet(s) 1230, but in this embodiment, the untrusted app subnet(s) may be configured to execute read operations in the DB subnet(s) 1230. The containers 1271(1)-(N) that can be contained in the VM 1266(1)-(N) of each customer and that may run code from the customer may not be communicatively coupled with the DB subnet(s) 1230.

In other embodiments, the control plane VCN 1216 and the data plane VCN 1218 may not be directly communicatively coupled. In this embodiment, there may be no direct communication between the control plane VCN 1216 and the data plane VCN 1218. However, communication can occur indirectly through at least one method. An LPG 1210 may be established by the IaaS provider that can facilitate communication between the control plane VCN 1216 and the data plane VCN 1218. In another example, the control plane VCN 1216 or the data plane VCN 1218 can make a call to cloud services 1256 via the service gateway 1236. For example, a call to cloud services 1256 from the control plane VCN 1216 can include a request for a service that can communicate with the data plane VCN 1218.

Figure 13:
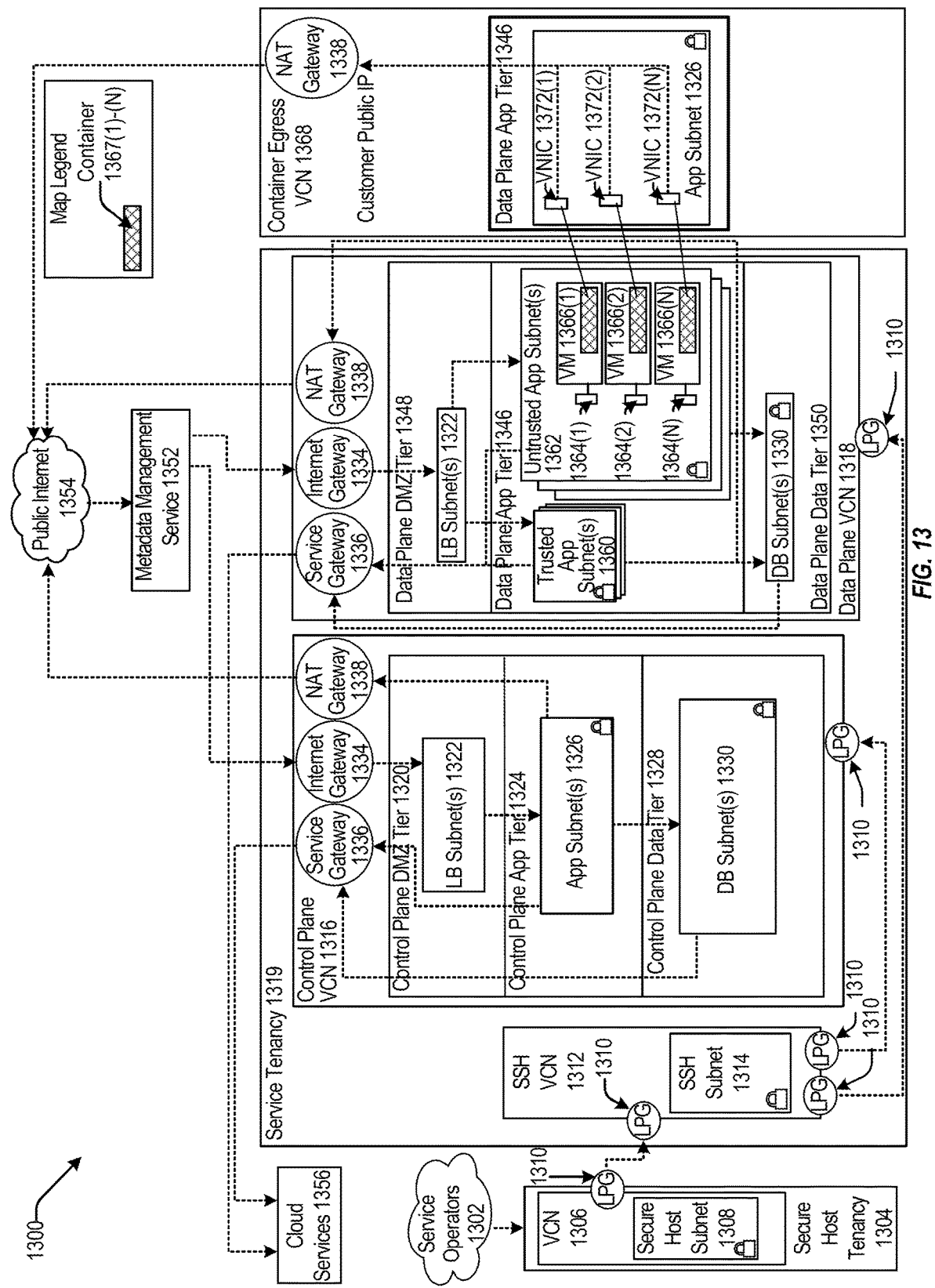
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1002 of FIG. 10) can be communicatively coupled to a secure host tenancy 1304 (e.g. the secure host tenancy 1004 of FIG. 10) that can include a virtual cloud network (VCN) 1306 (e.g. the VCN 1006 of FIG. 10) and a secure host subnet 1308 (e.g. the secure host subnet 1008 of FIG. 10). The VCN 1306 can include an LPG 1310 (e.g. the LPG 1010 of FIG. 10) that can be communicatively coupled to an SSH VCN 1312 (e.g. the SSH VCN 1012 of FIG. 10) via an LPG 1310 contained in the SSH VCN 1312. The SSH VCN 1312 can include an SSH subnet 1314 (e.g. the SSH subnet 1014 of FIG. 10), and the SSH VCN 1312 can be communicatively coupled to a control plane VCN 1316 (e.g. the control plane VCN 1016 of FIG. 10) via an LPG 1310 contained in the control plane VCN 1316 and to a data plane VCN 1318 (e.g. the data plane 1018 of FIG. 10) via an LPG 1310 contained in the data plane VCN 1318. The control plane VCN 1316 and the data plane VCN 1318 can be contained in a service tenancy 1319 (e.g. the service tenancy 1019 of FIG. 10).

The control plane VCN 1316 can include a control plane DMZ tier 1320 (e.g. the control plane DMZ tier 1020 of FIG. 10) that can include LB subnet(s) 1322 (e.g. LB subnet(s) 1022 of FIG. 10), a control plane app tier 1324 (e.g. the control plane app tier 1024 of FIG. 10) that can include app subnet(s) 1326 (e.g. app subnet(s) 1026 of FIG. 10), a control plane data tier 1328 (e.g. the control plane data tier 1028 of FIG. 10) that can include DB subnet(s) 1330 (e.g. DB subnet(s) 1230 of FIG. 12). The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1034 of FIG. 10) that can be contained in the control plane VCN 1316, and the app subnet(s) 1326 can be communicatively coupled to the DB subnet(s) 1330 contained in the control plane data tier 1328 and to a service gateway 1336 (e.g. the service gateway of FIG. 10) and a network address translation (NAT) gateway 1338 (e.g. the NAT gateway 1038 of FIG. 10). The control plane VCN 1316 can include the service gateway 1336 and the NAT gateway 1338.

The data plane VCN 1318 can include a data plane app tier 1346 (e.g. the data plane app tier 1046 of FIG. 10), a data plane DMZ tier 1348 (e.g. the data plane DMZ tier 1048 of FIG. 10), and a data plane data tier 1350 (e.g. the data plane data tier 1050 of FIG. 10). The data plane DMZ tier 1348 can include LB subnet(s) 1322 that can be communicatively coupled to trusted app subnet(s) 1360 (e.g. trusted app subnet(s) 1260 of FIG. 12) and untrusted app subnet(s) 1362 (e.g. untrusted app subnet(s) 1262 of FIG. 12) of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include primary VNICs 1364(1)-(N) that can be communicatively coupled to tenant virtual machines (VMs) 1366(1)-(N) residing within the untrusted app subnet(s) 1362. Each tenant VM 1366(1)-(N) can run code in a respective container 1367(1)-(N), and be communicatively coupled to an app subnet 1326 that can be contained in a data plane app tier 1346 that can be contained in a container egress VCN 1368. Respective secondary VNICs 1372(1)-(N) can facilitate communication between the untrusted app subnet(s) 1362 contained in the data plane VCN 1318 and the app subnet contained in the container egress VCN 1368. The container egress VCN can include a NAT gateway 1338 that can be communicatively coupled to public Internet 1354 (e.g. public Internet 1054 of FIG. 10).

The Internet gateway 1334 contained in the control plane VCN 1316 and contained in the data plane VCN 1318 can be communicatively coupled to a metadata management service 1352 (e.g. the metadata management system 1052 of FIG. 10) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some examples, the pattern illustrated by the architecture of block diagram 1300 of FIG. 13 may be considered an exception to the pattern illustrated by the architecture of block diagram 1200 of FIG. 12 and may be desirable for a customer of the IaaS provider if the IaaS provider cannot directly communicate with the customer (e.g., a disconnected region). The respective containers 1367(1)-(N) that are contained in the VMs 1366(1)-(N) for each customer can be accessed in real-time by the customer. The containers 1367(1)-(N) may be configured to make calls to respective secondary VNICs 1372(1)-(N) contained in app subnet(s) 1326 of the data plane app tier 1346 that can be contained in the container egress VCN 1368. The secondary VNICs 1372(1)-(N) can transmit the calls to the NAT gateway 1338 that may transmit the calls to public Internet 1354. In this example, the containers 1367(1)-(N) that can be accessed in real-time by the customer can be isolated from the control plane VCN 1316 and can be isolated from other entities contained in the data plane VCN 1318. The containers 1367(1)-(N) may also be isolated from resources from other customers.

In other examples, the customer can use the containers 1367(1)-(N) to call cloud services 1356. In this example, the customer may run code in the containers 1367(1)-(N) that requests a service from cloud services 1356. The containers 1367(1)-(N) can transmit this request to the secondary VNICs 1372(1)-(N) that can transmit the request to the NAT gateway that can transmit the request to public Internet 1354. Public Internet 1354 can transmit the request to LB subnet(s) 1322 contained in the control plane VCN 1316 via the Internet gateway 1334. In response to determining the request is valid, the LB subnet(s) can transmit the request to app subnet(s) 1326 that can transmit the request to cloud services 1356 via the service gateway 1336.

It should be appreciated that IaaS architectures 1000, 1100, 1200, 1300 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 14:
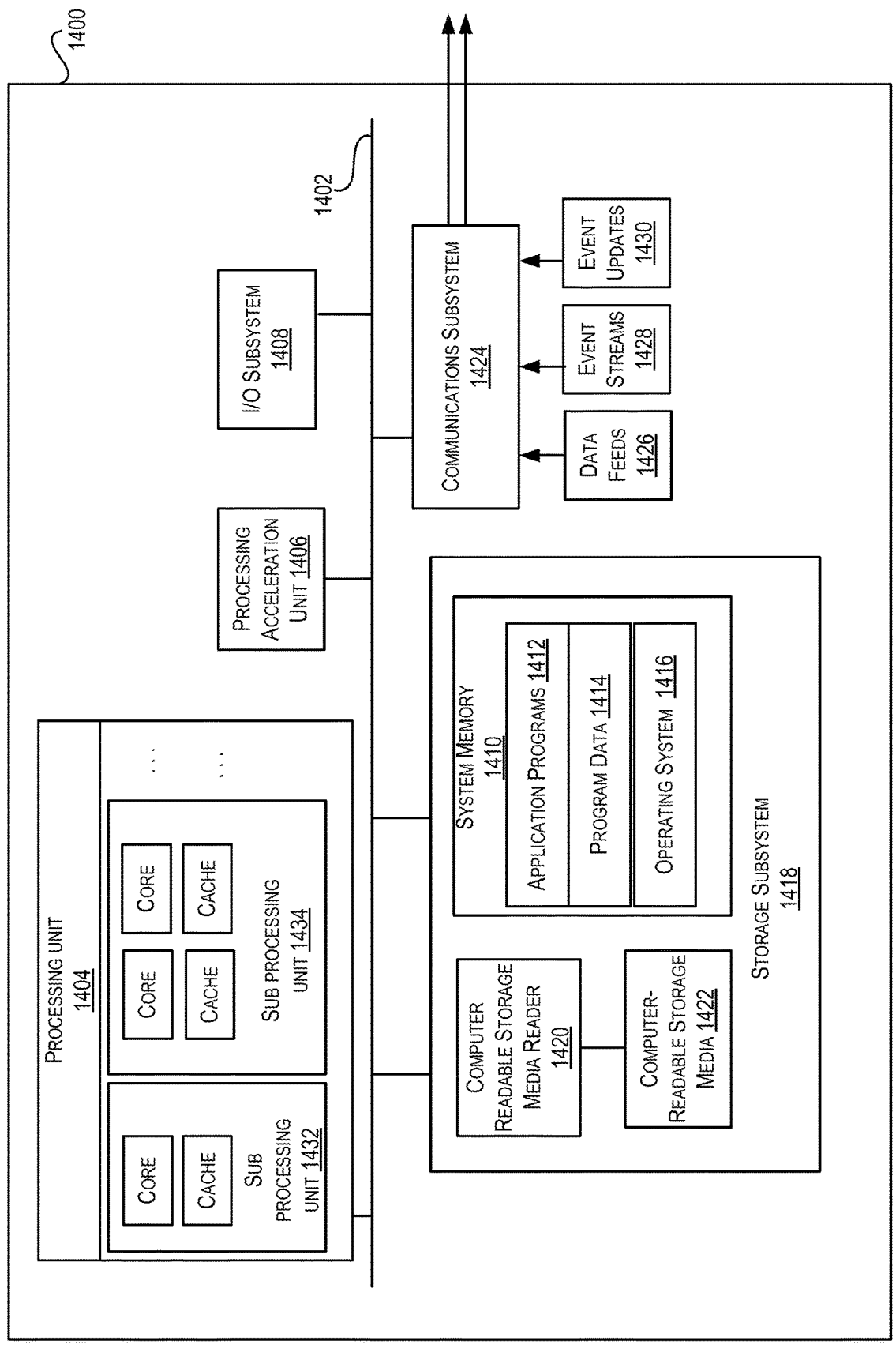
FIG. 14 is a block diagram illustrating an example computer system, according to at least one embodiment.

FIG. 14 illustrates an example computer system 1400, in which various embodiments may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that comprises software elements, shown as being currently located within a system memory 1410. System memory 1410 may store program instructions that are loadable and executable on processing unit 1404, as well as data generated during the execution of these programs.

Depending on the configuration and type of computer system 1400, system memory 1410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 may include multiple different types of memory, such as static random access memory (SRAM) or dynamic random access memory (DRAM). In some implementations, a basic input/output system (BIOS), containing the basic routines that help to transfer information between elements within computer system 1400, such as during start-up, may typically be stored in the ROM. By way of example, and not limitation, system memory 1410 also illustrates application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 14 OS, and Palm® OS operating systems.

Storage subsystem 1418 may also provide a tangible computer-readable storage medium for storing the basic programming and data constructs that provide the functionality of some embodiments. Software (programs, code modules, instructions) that when executed by a processor provide the functionality described above may be stored in storage subsystem 1418. These software modules or instructions may be executed by processing unit 1404. Storage subsystem 1418 may also provide a repository for storing data used in accordance with the present disclosure.

Storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1400.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   for a first version of a component to be deployed as part of a deployed application, monitoring, by a computer system, network traffic flow to and from the first version of the component, wherein a second version of the component is included in the deployed application, the first version being different from the second version;
   based upon the monitoring, identifying, by the computer system, a set of one or more network paths for the first version of the component, wherein a network path in the set of one or more network paths identifies at least one other component to which the first version of the component sends traffic;
   generating, by computer system, a component identifier that uniquely identifies the first version of the component;
   generating, by the computer system, a first network security policy for the first version of the component, wherein the first network security policy comprises information representative of the set of one or more network paths, and, wherein the first network security policy comprises information indicating that the first network security policy is applicable to the first version of the component identified by the component identifier; and
   generating, by the computer system, a deployment package for the application for adding the first version of the component to the deployed application in addition to the second version of the component, the deployment package comprising the first version of the component and the first network security policy.

2. The method of claim 1, wherein the first network security policy identifies the at least one component to which the first version of the component sends and receives network traffic.

3. The method of claim 1, wherein the first network security policy includes the component identifier, wherein the component identifier comprises a version label that uniquely identifies the first version of the component.

4. The method of claim 3, wherein the version label represents a current timestamp, a commit identifier, or a version identifier for the first version of the component.

5. The method of claim 1, further comprising deploying the deployment package to a first computing node in a computing environment of the computer system, and, wherein the second version of the component is deployed on a second computing node in the computing environment.

6. The method of claim 1, wherein the second version of the component is associated with a second network security policy, wherein the second network security policy comprises information representative of a set of one or more network paths for the second version, and, wherein a network path in the set of one or more network paths identifies at least one component to which the second version of the component sends and receives traffic.

7. The method of claim 6, wherein the second network security policy comprises information indicating that the second network security policy is applicable to second version of the component identified by a component identifier that uniquely identifies the second version of the component.

8. The method of claim 6, wherein at least one network path in the set of network paths for the first version of the component is different from a network path in a set of network paths for the second version of the component.

9. The method of claim 6, wherein the second network security policy is different from the first network security policy.

10. The method of claim 1, further comprising:
    determining, by the computer system, that the set of one or more network paths for the first version of the component are compliant with a set of pre-defined polices defined for the application;
    responsive to the determining, generating, by the computer system, the component identifier that uniquely identifies the first version of the component; and
    generating, by the computer system, the first network security policy for the first version of the component, wherein the first network security policy comprises information representative of the set of one or more network paths and the component identifier.

11. The method of claim 1, further comprising:
    determining, by the computer system, that the set of one or more network paths for the first version of the component are not compliant with a set of pre-defined polices defined for the application; and
    responsive to the determining, providing, by the computer system, information indicating a failure of deployment of the new version of the component in the computing environment.

12. The method of claim 1, wherein the network security policy for the new version of the component comprises a first label for the new version of the component, wherein the first label identifies a first group of components to which the first version of the component sends traffic.

13. The method of claim 12, wherein the network security policy for the new version of the component comprises a second label for the new version of the component, wherein the second label identifies a second group of components to which the first version of the component sends traffic, wherein the second group of components is a subset of the first group of components.

14. A system, comprising:
    a processor; and
    a memory storing instructions that, when executed by the processor, configure the system to:
    for a first version of a component to be deployed as part of a deployed application, monitor network traffic flow to and from the first version of the component, wherein a second version of the component is included in the deployed application, the first version being different from the second version;

based upon the monitoring, identify a set of one or more network paths for the first version of the component, wherein a network path in the set of one or more network paths identifies at least one other component to which the first version of the component sends traffic;

generate a component identifier that uniquely identifies the first version of the component;

generate a first network security policy for the first version of the component, wherein the first network security policy comprises information representative of the set of one or more network paths, and, wherein the first network security policy comprises information indicating that the first network security policy is applicable to the first version of the component identified by the component identifier; and generate a deployment package for the application for adding the first version of the component to the deployed application in addition to the second version of the component, the deployment package comprising the first version of the component and the first network security policy.

15. The system of claim 14, wherein the first network security policy identifies the at least one component to which the first version of the component sends and receives network traffic.

16. The system of claim 14, wherein the first network security policy includes the component identifier, wherein the component identifier comprises a version label that uniquely identifies the first version of the component.

17. The system of claim 14, wherein the second version of the component is associated with a second network security policy, wherein the second network security policy comprises information representative of a set of one or more network paths for the second version, and, wherein a network path in the set of one or more network paths identifies at least one component to which the second version of the component sends and receives traffic.

18. A non-transitory computer-readable medium having program code that is stored thereon, the program code executable by one or more processing devices for performing operations comprising:

for a first version of a component to be deployed as part of a deployed application, monitoring network traffic flow to and from the first version of the component, wherein a second version of the component is included in the deployed application, the first version being different from the second version;

based upon the monitoring, identifying a set of one or more network paths for the first version of the component, wherein a network path in the set of one or more network paths identifies at least one other component to which the first version of the component sends traffic;

generating a component identifier that uniquely identifies the first version of the component;

generating a first network security policy for the first version of the component, wherein the first network security policy comprises information representative of the set of one or more network paths, and, wherein the first network security policy comprises information indicating that the first network security policy is applicable to the first version of the component identified by the component identifier; and generating a deployment package for the application for adding the first version of the component to the deployed application in addition to the second version of the component, the deployment package comprising the first version of the component and the first network security policy.

19. The non-transitory computer-readable medium of claim 18, further comprising deploying the deployment package to a first computing node in a computing environment of the computer system, and, wherein the second version of the component is deployed on a second computing node in the computing environment.

20. The non-transitory computer-readable medium of claim 18, further comprising:

determining that the set of one or more network paths for the first version of the component are compliant with a set of pre-defined polices defined for the application;

responsive to the determining, generating the component identifier that uniquely identifies the first version of the component; and generating first network security policy for the first version of the component, wherein the first network security policy comprises information representative of the set of one or more network paths and the component identifier.

* * * * *

UNITED STATES PATENT AND TRADEMARK OFFICE
CERTIFICATE OF CORRECTION

PATENT NO. : 11,539,754 B2
APPLICATION NO. : 17/124162
DATED : December 27, 2022
INVENTOR(S) : Pieczul et al.

It is certified that error appears in the above-identified patent and that said Letters Patent is hereby corrected as shown below:

On the Title Page

On page 2, Column 2, under Other Publications, Line 16, delete "Istion" and insert -- Istio --, therefor.

In the Drawings

On sheet 3 of 14, in FIG. 3, under Reference Numeral 304, Line 6, delete "massage-queue" and insert -- message-queue --, therefor.

On sheet 3 of 14, in FIG. 3, under Reference Numeral 306, Line 10, delete "massage-queue" and insert -- message-queue --, therefor.

On sheet 3 of 14, in FIG. 3, under Reference Numeral 308, Line 8, delete "massage-queue" and insert -- message-queue --, therefor.

On sheet 6 of 14, in FIG. 6, under Reference Numeral 602, Line 1, delete "Accepance" and insert -- Acceptance --, therefor.

On sheet 8 of 14, in FIG. 8, under Reference Numeral 804, Line 6, delete "IDENTIIFER" and insert -- IDENTIFIER --, therefor.

In the Specification

In Column 3, Line 58, delete "embodiment" and insert -- embodiment. --, therefor.

In Column 3, Line 61, delete "embodiments" and insert -- embodiments. --, therefor.

In Column 5, Line 11, delete "in in" and insert -- in --, therefor.

In Column 8, Line 21, delete "programing" and insert -- Programming --, therefor.

Signed and Sealed this
Sixteenth Day of April, 2024

Katherine Kelly Vidal
*Director of the United States Patent and Trademark Office*

In Column 13, Line 18, before "be" delete "not", therefor.

In Column 18, Line 44, delete "node" and insert -- node. --, therefor.